United States Patent
Rollinger et al.

(10) Patent No.: US 10,408,114 B2
(45) Date of Patent: *Sep. 10, 2019

(54) GASOLINE PARTICULATE FILTER DIAGNOSTICS

(71) Applicant: Ford Global Technologies, LLC, Dearborn, MI (US)

(72) Inventors: John Eric Rollinger, Troy, MI (US); Douglas Raymond Martin, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 90 days.

This patent is subject to a terminal disclaimer.

(21) Appl. No.: 15/673,612

(22) Filed: Aug. 10, 2017

(65) Prior Publication Data
US 2019/0048777 A1 Feb. 14, 2019

(51) Int. Cl.
| F01N 11/00 | (2006.01) |
| F01N 1/16 | (2006.01) |
| F01N 3/021 | (2006.01) |
| F01N 13/00 | (2010.01) |
| F01N 3/031 | (2006.01) |

(52) U.S. Cl.
CPC ............ *F01N 11/002* (2013.01); *F01N 1/165* (2013.01); *F01N 1/168* (2013.01); *F01N 3/021* (2013.01); *F01N 3/031* (2013.01); *F01N 13/008* (2013.01); *F01N 2240/36* (2013.01); *F01N 2550/04* (2013.01); *F01N 2560/08* (2013.01); *F01N 2560/14* (2013.01); *F01N 2900/1406* (2013.01)

(58) Field of Classification Search
CPC combination set(s) only.
See application file for complete search history.

(56) References Cited

U.S. PATENT DOCUMENTS 6,756,904 B2 * 6/2004 Kinugawa ............... F01N 9/002
340/439
6,947,831 B2 9/2005 van Nieuwstadt
(Continued)

FOREIGN PATENT DOCUMENTS

| JP | 2013170978 A | * | 2/2012 | ............... G01F 1/00 |
| JP | 2013170978 A | | 9/2013 | |
| WO | 2009024702 A1 | | 2/2009 | |

OTHER PUBLICATIONS

United States Patent and Trademark Office, Office Action Issued in U.S. Appl. No. 15/673,561, dated Sep. 5, 2018, 13 pages.
(Continued)

*Primary Examiner* — Binh Q Tran
(74) *Attorney, Agent, or Firm* — Julia Voutyras; McCoy Russell LLP

(57) ABSTRACT

Methods and systems are provided for diagnostics of a gasoline particulate filter in an exhaust system. In one example, a method may include during conditions where a differential pressure sensor is exposed to changing exhaust pressure, indicating degradation of a hose coupled across a particulate filter in an exhaust system responsive to a change in differential pressure measured by the differential pressure sensor being different than an expected change, the differential pressure sensor positioned in the hose and the particulate filter positioned upstream of an exhaust tuning valve.

19 Claims, 11 Drawing Sheets

(56) References Cited

U.S. PATENT DOCUMENTS

| | | | |
|---|---|---|---|
| 7,396,389 B2* | 7/2008 | Kariya | B01D 46/2418 |
| | | | 55/282.2 |
| 8,261,540 B2* | 9/2012 | Konstandopoulos | F01N 3/021 |
| | | | 55/282.2 |
| 8,974,563 B2* | 3/2015 | Haseyama | F01N 3/0253 |
| | | | 422/169 |
| 9,645,068 B2* | 5/2017 | Zhang | F01N 11/002 |
| 2008/0110238 A1 | 5/2008 | Kariya et al. | |
| 2009/0084097 A1* | 4/2009 | Sato | F01N 11/002 |
| | | | 60/311 |
| 2015/0240696 A1* | 8/2015 | Saitou | G01M 15/106 |
| | | | 73/114.76 |
| 2015/0369700 A1 | 12/2015 | Varney | |

OTHER PUBLICATIONS

Van Nieuwstadt, M. et al., "Gasoline Particulate Filter Diagnostics," U.S. Appl. No. 15/673,561, Filed Aug. 10, 2017, 82 pages.

* cited by examiner

GASOLINE PARTICULATE FILTER DIAGNOSTICS

FIELD

The present description relates generally to an exhaust treatment system for a combustion engine, and particularly to diagnostics of particulate matter filter for gasoline engines.

BACKGROUND/SUMMARY

Internal combustion engines, in particular gasoline engines with direct injection, generate fine particulate matter during engine operation that may be subject to emission standards. To enable emission compliance, gasoline particulate filters (GPFs) may be included in the engine exhaust, to trap particulate matter before releasing the exhaust to the atmosphere, wherein regeneration of the filter and filter functioning may be controlled and regularly assessed. Sometimes, the particulate filter may not be able to trap particulate matter due to degradation of the filter. In other circumstances, the filter may be missing or be removed from an exhaust system. In order to detect a degraded or missing GPF, one or more pressure sensors may be used for diagnosis and such sensors may be coupled upstream and/or downstream of the GPF.

As such, various types of pressure sensors have been developed for use that are configured to detect filter degradation and monitor filter performance. One example approach shown by Nieuwstadt in U.S. Pat. No. 6,947,831 discloses the use of a differential pressure sensor to determine the state of a particulate filter for regeneration purposes. By monitoring differential pressure across the filter and comparing it against a threshold, a filter regeneration may be performed or degradation of the filter may be diagnosed. Nieuwstadt also discloses that the differential pressure sensor could get degraded, resulting in erroneous determination that the filter itself has become degraded. Therein, a comparison of expected pressure response with actual pressure reading based to exhaust flow variation may be used to indicate pressure sensor degradation, and regeneration of the filter may be controlled accordingly.

However, the inventors herein have recognized potential issues with the above approaches. As one example, the downstream and/or upstream connections of the differential pressure sensor to the particulate filter in the exhaust system might become disconnected, resulting in inaccurate pressure readings. Additionally, in vehicle systems that include an exhaust tuning valve in addition to a differential pressure sensor, if the downstream hose connection between the particulate filter and differential pressure sensor becomes disconnected and the exhaust tuning valve is closed, a missing or a degraded particulate filter may be undetectable. With the exhaust tuning valve closed and the downstream hose disconnected or degraded, the increased exhaust backpressure resulting from the closure of the valve is sensed by the differential pressure sensor on the upstream hose-side of the differential pressure sensor, but the downstream hose-side of the differential pressure sensor senses atmospheric pressure. Thus, the differential pressure sensor may measure an increase in differential pressure when the exhaust tuning valve closes and the downstream hose is disconnected, even when the GPF is missing or degraded, which may mimic the pressure drop measured by the differential pressure sensor when an intact, non-degraded GPF is present.

In one example, the issues described above may be addressed by a method including, during conditions where a differential pressure sensor is exposed to changing exhaust pressure, indicating degradation of a hose coupled across a particulate filter in an exhaust system responsive to a change in differential pressure measured by the differential pressure sensor being different than an expected change, the differential pressure sensor positioned in the hose and the particulate filter positioned upstream of an exhaust tuning valve.

In this way, GPF diagnostics may be performed with higher reliability and a distinction may be made between the degradation of the particulate filter versus the connection of the differential pressure sensor that may have become disconnected during engine operation. Overall, accuracy and reliability of diagnosing of an exhaust particulate filter is increased, while enabling higher emissions compliance.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
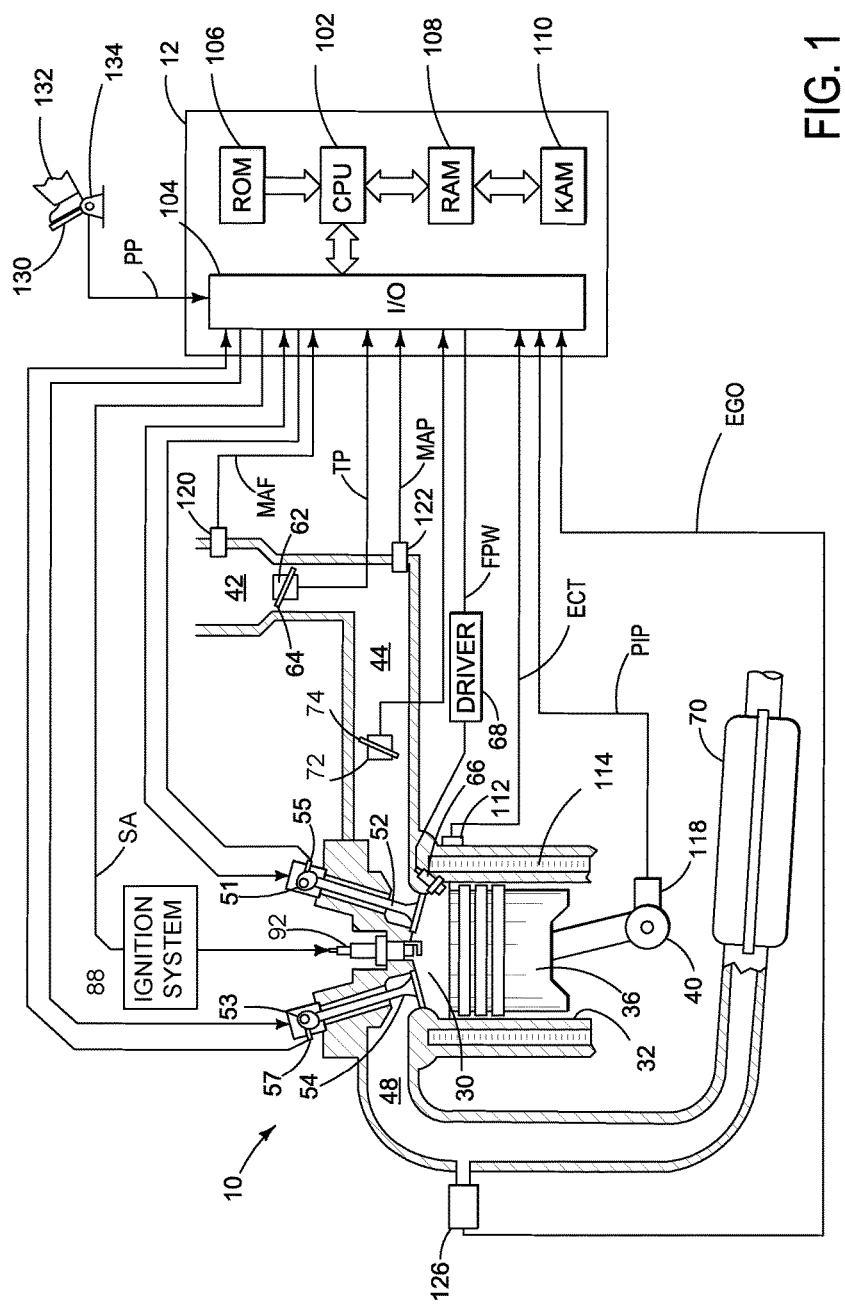
FIG. 1 shows a schematic depiction of an internal combustion engine with an exhaust system having an exhaust aftertreatment device.
Figure 2:
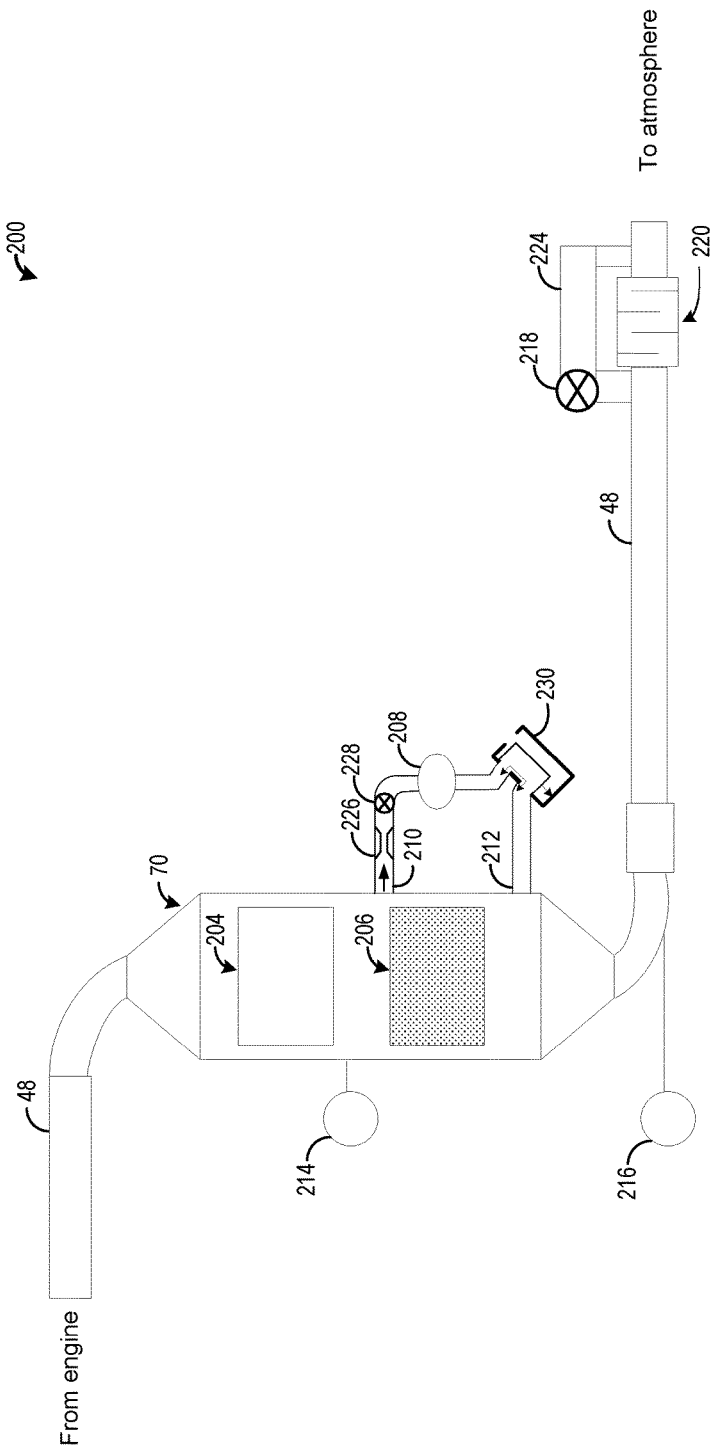
FIG. 2 shows a detailed view of the exhaust aftertreatment device of FIG. 1.
Figure 3:
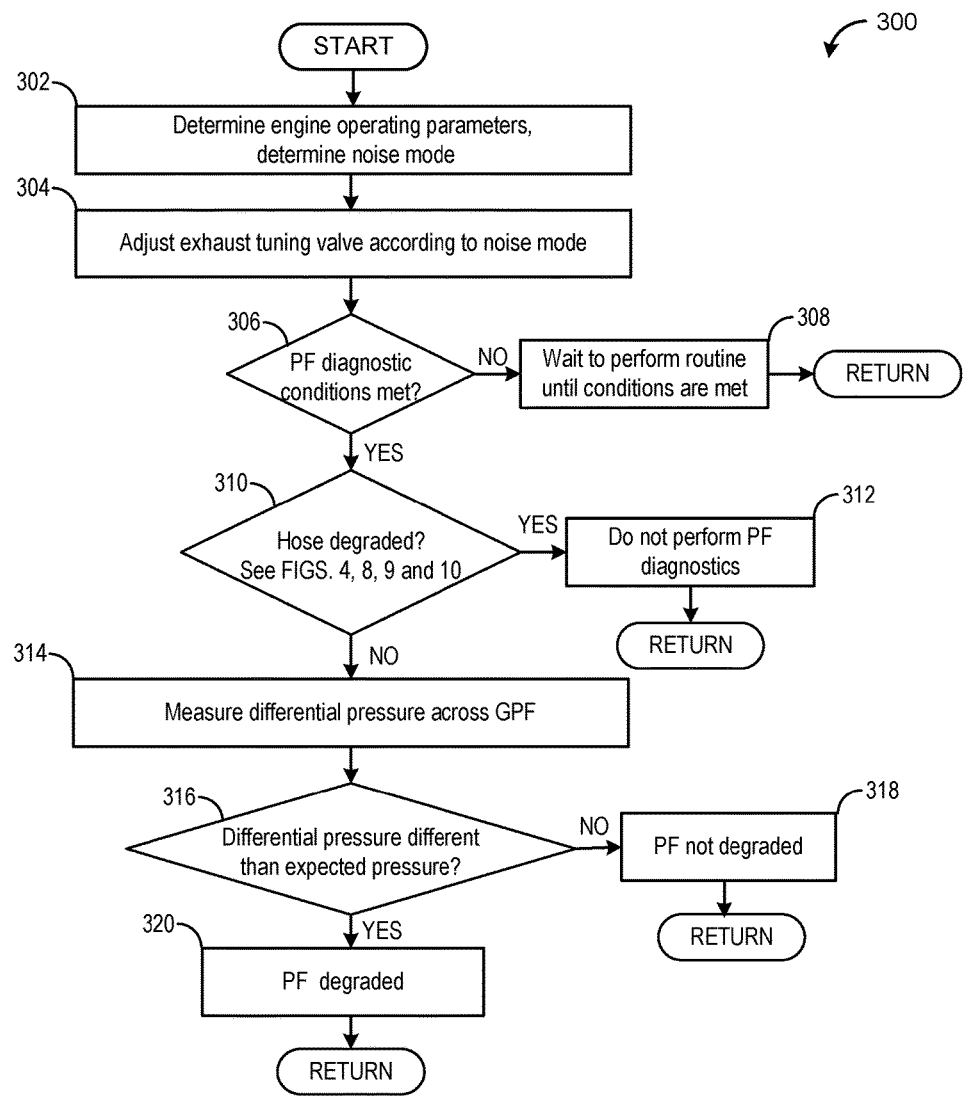
FIG. 3 shows a flowchart illustrating a method for diagnosing degradation of a particulate filter.

The following description details a method for operating an engine, such as the engine illustrated in FIG. 1, equipped with a particulate filter, such as a gasoline particulate filter (GPF), coupled with upstream and downstream connections to a differential pressure (DP) sensor in an exhaust system. The exhaust system also includes an exhaust tuning valve positioned downstream of both the filter and the differential pressure sensor, as shown in FIG. 2, that is controlled to regulate backpressure from the exhaust under certain engine operating conditions, according to the method illustrated in FIG. 4, for example. Further, the GPF may be monitored for degradation based on output from the DP sensor, as illustrated in FIG. 3.

Figure 4:
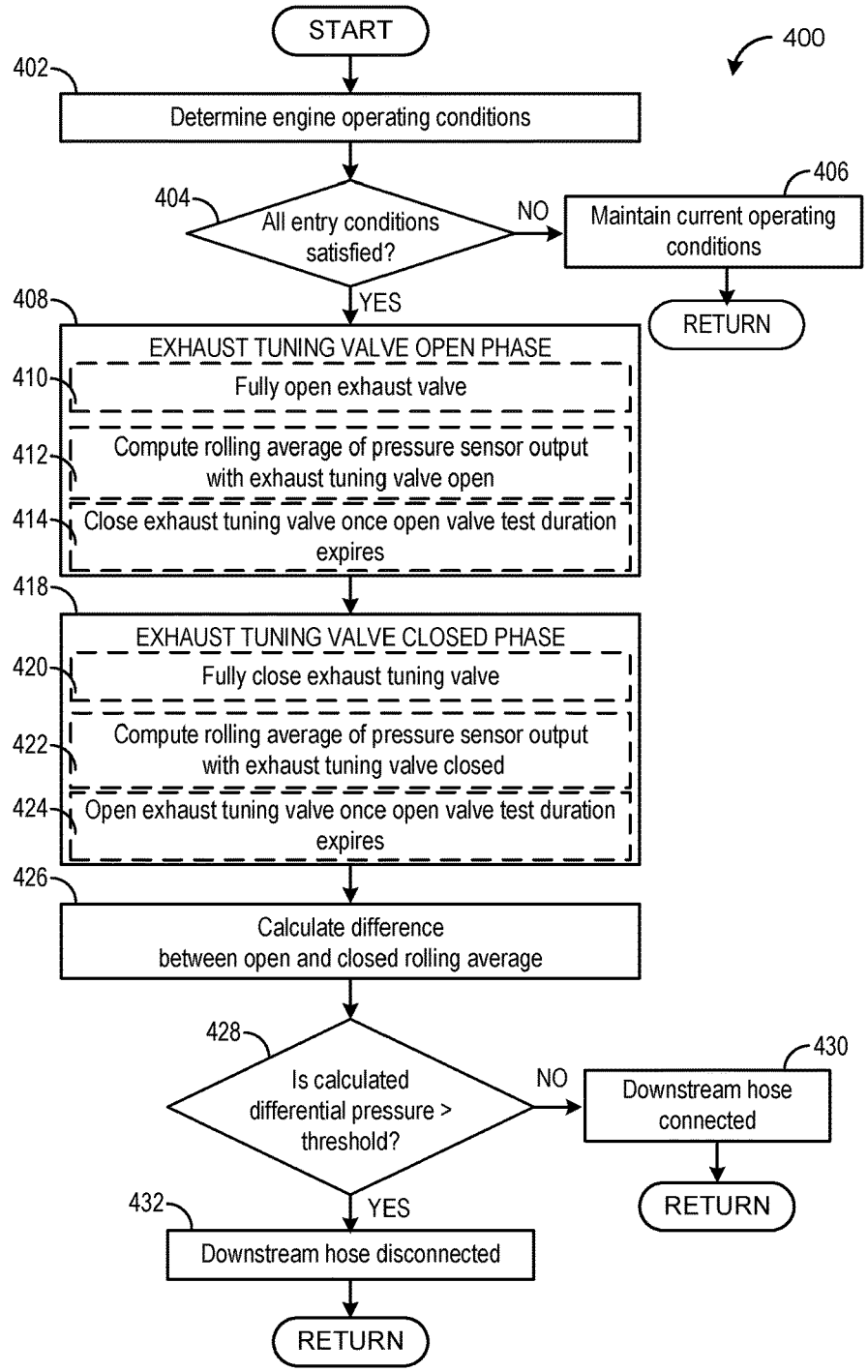
FIG. 4 shows a flowchart illustrating a first embodiment of a method for diagnosing degradation of a downstream hose in housing a differential pressure sensor.
Figure 5:
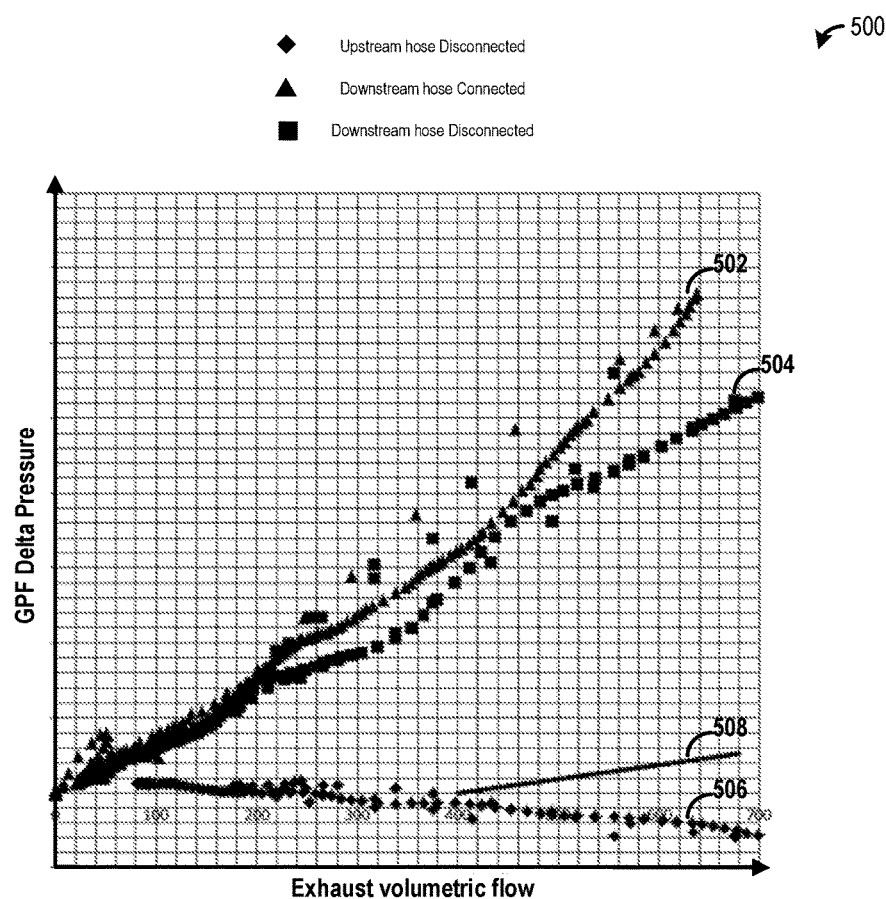
FIG. 5 shows a graph depicting the output of the differential pressure sensor coupled across the particulate filter in the exhaust device.
Figure 6:
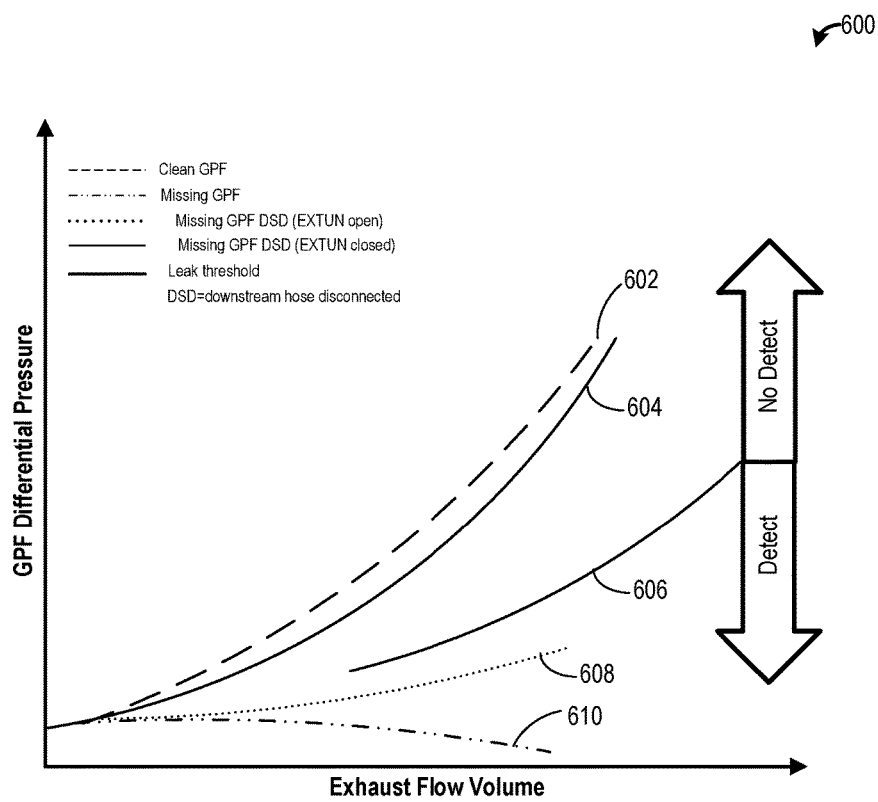
FIG. 6 shows a graph depicting the detection threshold of differential pressure output of the differential pressure sensor.
Figure 7:
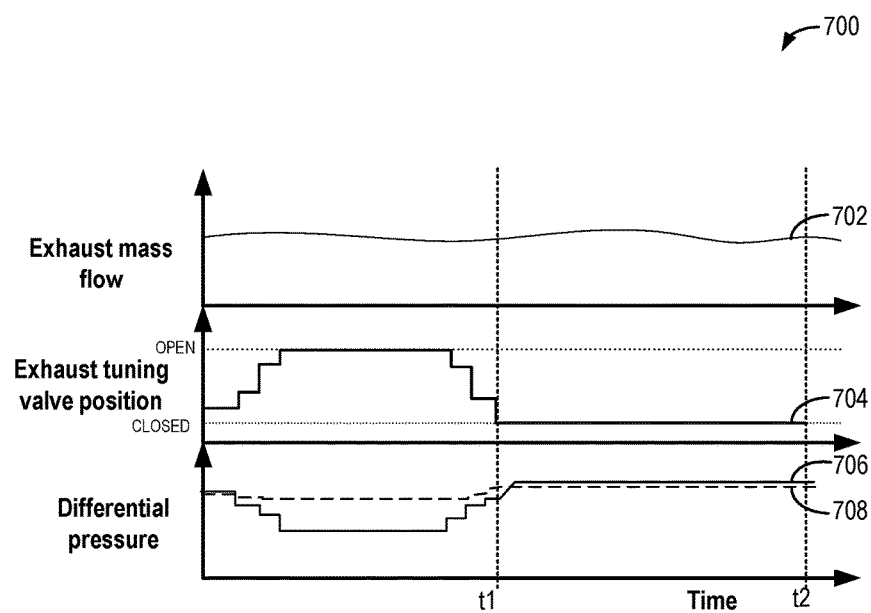
FIG. 7 shows an example diagram of operating parameters during a diagnosis of a downstream hose disconnection based on the variation in differential pressure output during exhaust tuning valve open and closed durations.

During engine operation, the downstream connection of the differential pressure sensor to the filter may become disconnected and if the exhaust tuning valve is in a closed position, GPF degradation may be challenging to detect, shown by the graphs of FIGS. 5-6. Therefore, during selected conditions, an engine controller may be configured to perform an intrusive test operation so as to assess degradation of the downstream hose connection by evaluating the output of the differential pressure sensor. In particular, the controller may perform a diagnostic routine, such as the example routine illustrated in FIG. 4, where the exhaust tuning valve may be first held open and a corresponding first differential pressure may be obtained from the output of the differential pressure sensor, followed by the exhaust tuning valve held closed, and a second differential pressure may be obtained from the output of the differential pressure sensor, as shown by the diagram of FIG. 7. The pressure difference computed by the controller may then be evaluated against a diagnostic threshold indicating degradation of the downstream connection of the DP sensor to the GPF of the engine exhaust system. If the downstream hose connection of the DP sensor is found to be disconnected, filter diagnostic routines may not be performed. In this way, filter performance can be reliably monitored and diagnosed, while improving vehicle diagnostics.

In another example, in an exhaust system with a passive exhaust tuning valve, the downstream connection of the differential pressure sensor to the filter may become disconnected. A passive exhaust tuning valve may be a normally closed valve and may be moved to an open position based on exhaust flow pressure flowing through the exhaust system (e.g., when exhaust flow or pressure is greater than a threshold, where the threshold may include exhaust flow produced during high engine load and/or high engine speed conditions). As described above, GPF degradation may be challenging to detect with an exhaust tuning valve in a closed position. Since the passive exhaust tuning valve is not an actively controlled valve, an intrusive test operation for diagnosing a downstream hose disconnect as illustrated in FIG. 4 is not feasible. Therefore, during selected conditions, an engine controller may be configured to perform one or more methods employing an orifice included in the upstream hose, a pneumatic valve positioned in the upstream hose, and/or a vent-vacuum valve fluidly coupled to the downstream hose for diagnosing degradation of a downstream hose with a passive exhaust tuning valve. Specifically, during conditions where changes in mass airflow through the exhaust are occurring with a closed passive exhaust tuning valve, the pressure measurement on the downstream side of the hose may be isolated from the pressure measurement on the upstream side (e.g., by closing the pneumatic valve or adjusting the position of the vent-vac valve), and degradation may be indicated if the downstream side does not show a corresponding change in pressure. In other examples, the pressure measured on the upstream side may change more slowly than the pressure measured on the downstream side (e.g., by inclusion of the orifice), and during a decrease in exhaust mass flow, degradation may be indicated if a decrease in differential pressure is observed.

Figure 8:
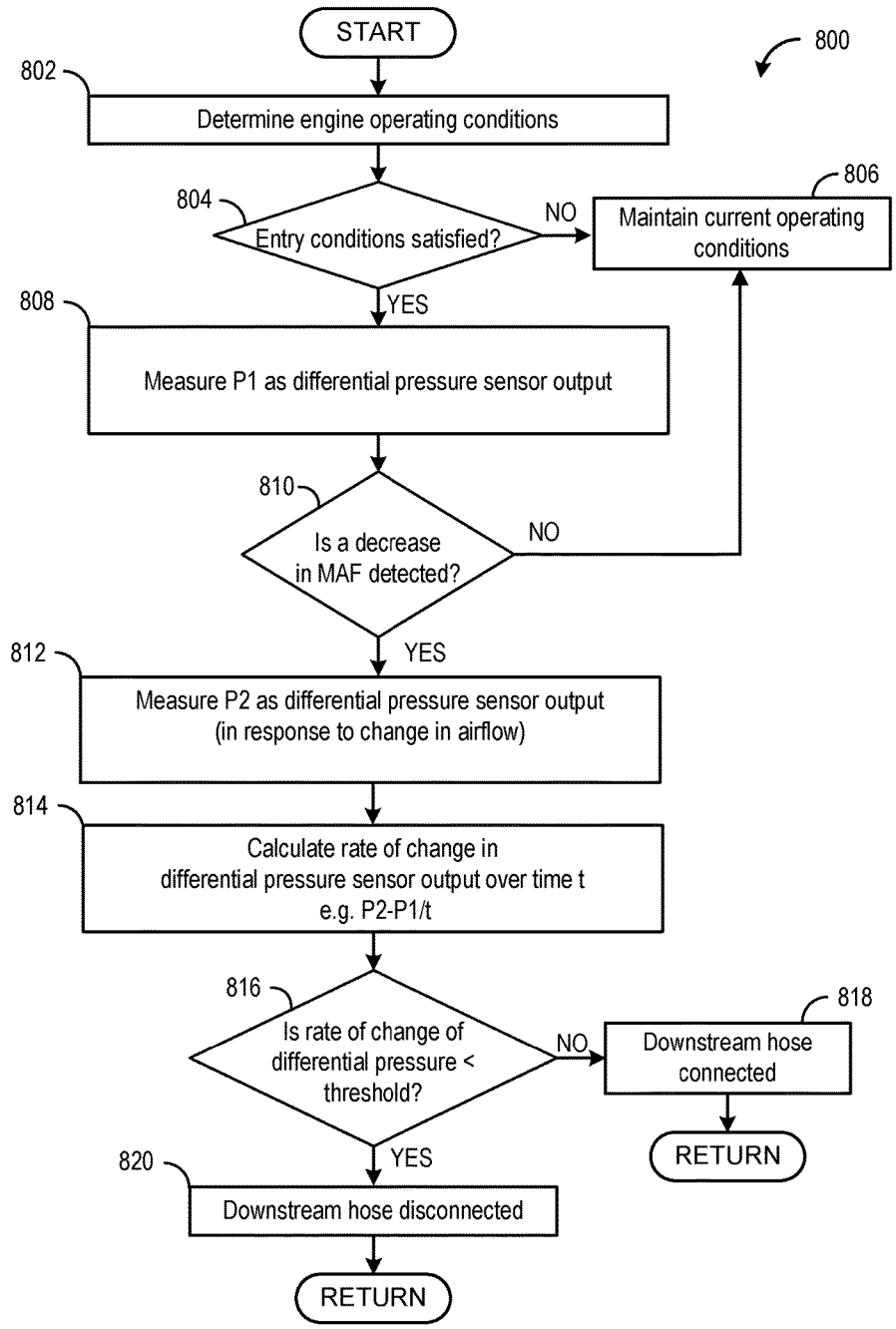
FIG. 8 shows a flowchart illustrating a second embodiment of a method for diagnosing degradation of a downstream hose in housing a differential pressure sensor.
Figure 9:
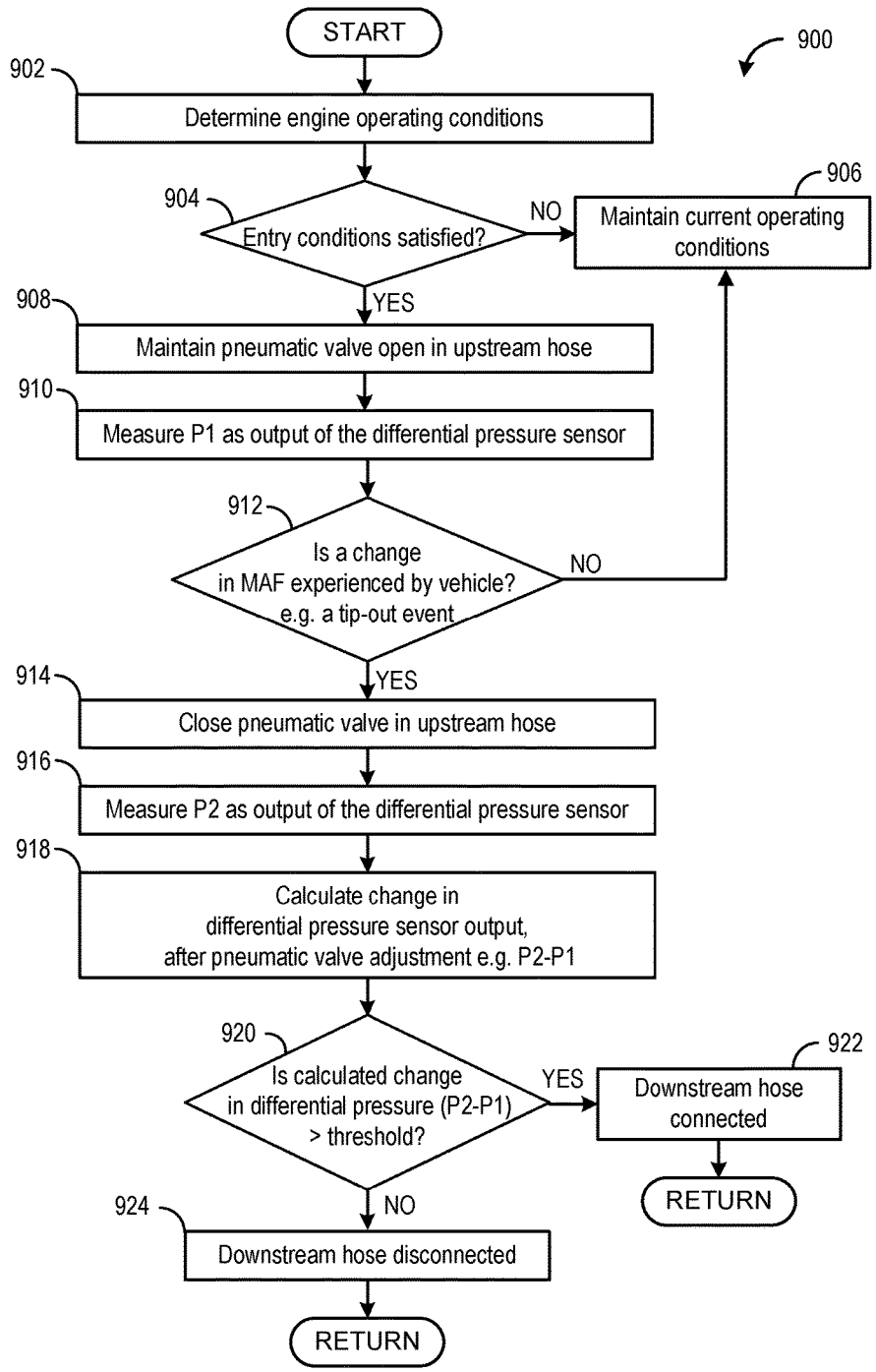
FIG. 9 shows a flowchart illustrating a third embodiment of a method for diagnosing degradation of a downstream hose in housing a differential pressure sensor.
Figure 10:
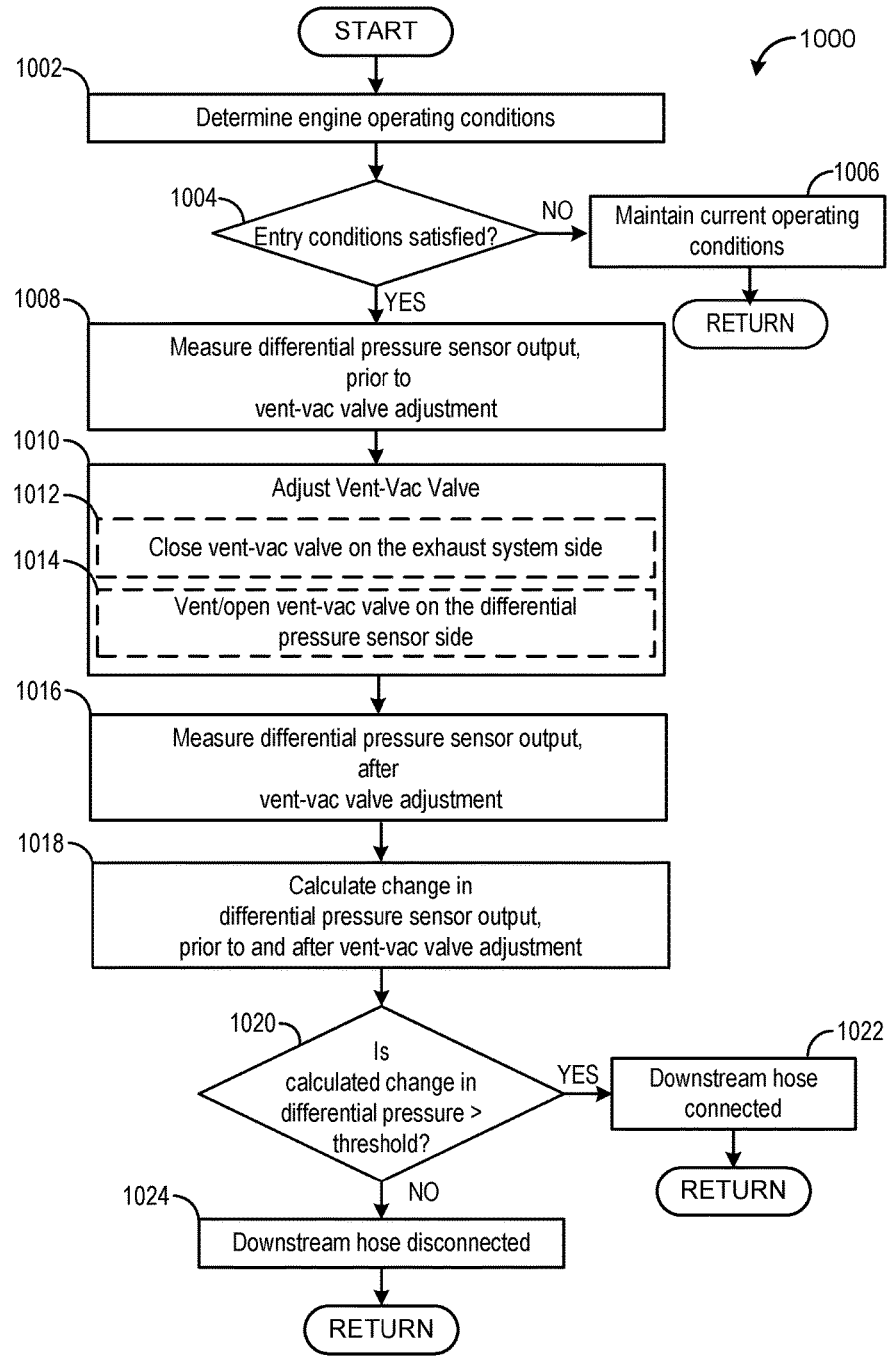
FIG. 10 shows a flowchart illustrating a fourth embodiment of a method for diagnosing degradation of a downstream hose in housing a differential pressure sensor.

In particular, the controller may perform diagnostic routines, such as the example routines illustrated in FIGS. 8-10, where a corresponding first differential pressure may be obtained from the output of the differential pressure sensor under a first set of conditions followed by a second differential pressure obtained under a different set of conditions e.g. change in airflow through the exhaust, tip-in, tip-out, etc. The change in differential pressure computed by the controller may then be evaluated against a diagnostic threshold indicating degradation of the downstream connection of the DP sensor to the GPF of the engine exhaust system. If the downstream hose connection of the DP sensor is found to be disconnected, filter diagnostic routines may not be performed.

In an example, an exhaust system includes an orifice in the upstream hose connection and a passive exhaust tuning valve. Degradation of a downstream hose may be diagnosed when changes in airflow through the exhaust are present. The purpose of the orifice may be to reduce pressure fluctuations or exhaust flow variations, thus resulting in a smooth signal output from the DP sensor, and further to cause the upstream hose to depressurize at a slower rate than the downstream hose during tip-out events, for example. A first pressure output from the DP sensor may be obtained under steady-state conditions (e.g., where exhaust mass flow is not changing by a substantial amount). In the event of detected change in mass airflow, additional pressure outputs from the DP sensor may be obtained. Further, a change in the differential pressure sensor output may be computed as a function of time. Such a change, if determined to be less than a threshold, may indicate the downstream hose as disconnected. This is because when the downstream hose is disconnected, the downstream side of the differential pressure continues to measure atmospheric pressure, even as the upstream side measures a change in exhaust pressure, resulting in a relatively large change (e.g., decrease) in differential pressure. In contrast, when the downstream hose is connected, both the upstream pressure and downstream pressure will change, although the upstream pressure will change at a slower rate than the downstream pressure. This may result in a brief increase in differential pressure followed by a decrease in differential pressure, as the downstream hose depressurizes faster than the upstream hose during the decreasing exhaust flow.

In an example, an exhaust system includes a pneumatic valve in the upstream hose connection along with a passive exhaust tuning valve. Degradation of a downstream hose may be diagnosed when changes in airflow through the exhaust are present. Herein, a first pressure output from the DP sensor may be calculated when the pneumatic valve is actuated to be open. In the event of a change in mass airflow being detected, the pneumatic valve may be fully closed and one or more additional pressure outputs from the DP sensor may be obtained. A change in the differential pressure sensor output may then be computed and compared to a diagnostic threshold to determine if the downstream hose is disconnected. If the hose is disconnected, closing of the valve would result in a non-changing differential pressure due to both the upstream and downstream sides of the differential pressure sensor being exposed to constant pressure (due to the trapping of exhaust upstream following the closure of the valve and the exposure of the downstream side to atmosphere via the disconnected hose). In contrast, when the downstream hose is connected, closure of the valve results in a changing differential pressure due to the upstream side measuring constant pressure and the downstream side measuring changing pressure as the exhaust mass flow changes.

In an example, the exhaust system includes a vent-vac valve in the downstream hose connection along with a passive exhaust tuning valve. Degradation of the downstream hose may be diagnosed during intrusive actuation of the vent-vac valve. Herein, a first pressure output from the DP sensor may be obtained before vent-vac valve actuation. The vent-vac valve may then be actuated/adjusted such that exhaust flowing into the downstream hose may be obstructed while the downstream end of the DP sensor may be exposed to atmosphere. A second pressure output from the DP sensor may be measured and a change in the differential pressure sensor output may then be computed and compared to a diagnostic threshold to determine if the downstream hose is disconnected. When the downstream hose is disconnected, the adjusting of the vent-vac valve to expose the downstream side of the differential pressure sensor to atmosphere would not result in a change in the output of the differential pressure sensor, as the downstream side of the differential pressure sensor would be exposed to atmosphere prior to the adjustment of the vent-vac valve due to the hose disconnection. In contrast, when the hose is connected, adjusting the vent-vac valve would result in a change (e.g., increase) in the differential pressure.

Referring now to FIG. 1, it includes a schematic diagram showing one cylinder of a multi-cylinder internal combustion engine 10. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP.

Combustion cylinder 30 of engine 10 may include combustion cylinder walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion cylinder 30 may receive intake air from intake manifold 44 via intake passage 42 and may exhaust combustion gases via exhaust passage 48. Intake manifold 44 and exhaust passage 48 can selectively communicate with combustion cylinder 30 via respective intake valve 52 and exhaust valve 54. In some embodiments, combustion cylinder 30 may include two or more intake valves and/or two or more exhaust valves.

In this example, intake valve 52 and exhaust valve 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion cylinder 30 for injecting fuel directly therein in proportion to the pulse width of signal FPW received from controller 12 via electronic driver 68. In this manner, fuel injector 66 provides what is known as direct injection of fuel into combustion cylinder 30. The fuel injector may be mounted on the side of the combustion cylinder or in the top of the combustion cylinder, for example. Fuel may be delivered to fuel injector 66 by a fuel delivery system (not shown) including a fuel tank, a fuel pump, and a fuel rail. In some embodiments, combustion cylinder 30 may alternatively or additionally include a fuel injector arranged in intake passage 42 in a configuration that provides what is known as port injection of fuel into the intake port upstream of combustion cylinder 30.

Intake passage 42 may include a charge motion control valve (CMCV) 74 and a CMCV plate 72 and may also include a throttle 62 having a throttle plate 64. In this particular example, the position of throttle plate 64 may be varied by controller 12 via a signal provided to an electric motor or actuator included with throttle 62, a configuration that may be referred to as electronic throttle control (ETC). In this manner, throttle 62 may be operated to vary the intake air provided to combustion cylinder 30 among other engine combustion cylinders. Intake passage 42 may include a mass air flow sensor 120 and a manifold air pressure sensor 122 for providing respective signals MAF and MAP to controller 12.

Ignition system 88 can provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of exhaust aftertreatment device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a $NO_x$, HC, or CO sensor. Exhaust aftertreatment device 70 may include a gasoline particulate filter (GPF) and one or more emission control devices, such as a three way catalyst (TWC) coupled together or separately (explained in more detail below with respect to FIG. 2). In other embodiments, the one or more emission control devices may be a NOx trap, various other emission control devices, or combinations thereof.

Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. The controller 12 may receive various signals and information from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from pressure sensor 122. Storage medium read-only memory 106 can be programmed with computer readable data representing instructions executable by processor 102 for performing the method described below as well as variations thereof. The controller 12 receives signals from the various sensors of FIG. 1 and employs the various actuators of FIG. 1 to adjust engine operation based on the received signals and instructions stored on a memory of the controller.

FIG. 2 schematically shows a detailed view of an exhaust system 200 coupled to the engine of FIG. 1. FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

Exhaust system 200 includes exhaust passage 48 and exhaust aftertreatment device 70. Exhaust aftertreatment device 70 includes a three way catalyst 204 and gasoline particulate filter 206 mounted in a common housing. According to one embodiment of the present disclosure, the TWC 204 may be positioned upstream of the GPF 206 and may function to reduce emissions by allowing catalytic oxidation of CO and hydrocarbons while simultaneously performing catalytic reduction of NOx. The catalyst material may include noble metals such as platinum, palladium, and/or rhodium. The exhaust gases that have been processed by passage through the TWC may then be filtered for particulate matter before expulsion into the atmosphere. As used herein, "upstream" and "downstream" may be relative to a direction of exhaust gas flow. For example, the TWC 204 being upstream of the GPF 206 includes the TWC receiving exhaust gas from the engine and flowing the exhaust gas to the GPF.

GPF 206 may comprise of a heat-resistant porous filter walls formed by ceramics, metallic fiber cloth, or other materials and structures that inhibit the path of particulate matter but do not completely enclose the exhaust gas and force it through a porous path. Further still, the structures may be arranged in strata or layers. Exhaust gases discharged from the exhaust port of cylinder 30 may flow into the exhaust passage 48 and pass through the GPF, and in the process, particulate matter may get deposited/filtered by the GPF. GPF 206 may function to retain residual soot exhausted from engine 10 to reduce emissions. In some examples, the retained particulates may further be oxidized to produce $CO_2$ in a forced regeneration process performed during engine operation.

While the depicted embodiment shows TWC device 204 positioned upstream of GPF 206, in an alternate embodiment, the TWC or alternatives thereof, could be positioned downstream of the particulate matter filter. In a still further embodiment, the filter substrate may include a catalytic coating comprising a one or more layer(s) of a three-way catalyst.

Exhaust passage 48 may receive exhaust gases from other cylinders of engine 10 in addition to cylinder 30. A plurality of sensors may be coupled to the exhaust system that includes the exhaust aftertreatment device 70. Exhaust temperature may be estimated by one or more temperature sensors such as temperature sensor 216 located downstream of the exhaust aftertreatment device 70. Alternatively or additionally, exhaust temperature may be inferred based on engine operating conditions such as speed, load, air-fuel ratio (AFR), spark retard, etc. A catalyst monitor sensor (CMS) 214 may be connected in the exhaust aftertreatment device 70 downstream of the TWC 204 and downstream of the pre-catalyst oxygen sensor (such as the UEGO sensor 126) to monitor the conversion efficiency of the TWC 204. A suitable number of exhaust gas sensors may be utilized including lambda sensors or proportional oxygen sensors to monitor catalyst performance.

A differential pressure (DP) sensor 208 is coupled to the exhaust aftertreatment device 70, across the GPF 206. According to an embodiment of the disclosure, the DP sensor 208 is connected to both an upstream side of the GPF via an upstream hose 210 and a downstream side of the GPF via a downstream hose 212. The upstream hose 210 includes a first end that connects to the DP sensor and a second end that connects upstream of the GPF 206 (and downstream of the TWC 204) in the exhaust aftertreatment device. The downstream hose 212 includes a first end that connects to the DP sensor and a second end that connects downstream of the GPF 206 in the exhaust aftertreatment device.

In a first embodiment, the upstream hose 210 may include a small orifice 226 positioned in the flow path of the upstream exhaust such that orifice 226 may act as a mechanical low-pass filter, reducing pressure or exhaust flow variations and thus resulting in a smooth signal from the DP sensor. The presence of the orifice in the upstream hose may even out upstream pressure fluctuations commonly seen in high exhaust flow conditions and subsequently allow for a leveled out signal from the DP sensor. In a second embodiment, the upstream hose 210 may include a pneumatic valve 228 fluidically coupled to the upstream hose. In one example, the pneumatic valve may be an active valve controlled via pneumatic pressure provided by a pneumatic actuator controlled by the controller. Pneumatic valve 228, when open, may allow the DP sensor 208 to measure exhaust pressure upstream of the GPF and when closed, may block fluidic coupling of the region upstream of the GPF with the DP sensor, thus preventing the DP sensor from measuring pressure upstream of the GPF. In a third embodiment, the downstream hose 212 may include a fluidically coupled vent-vacuum valve 230. Vent-vac valve 230 may be coupled to the downstream hose such that, when the vent-vac valve is in a first position, exhaust flowing into the downstream hose may pass via vent-vac valve 230 to the DP sensor to measure downstream exhaust pressure. The position of the vent-vac valve 230 may be varied by controller 12, wherein the controller may adjust the position of the valve to block exhaust flow into the downstream hose. The vent-vac valve when adjusted to a second position may block fluidic coupling of the downstream exhaust with the DP sensor and may further allow the downstream end of the DP sensor to sense atmospheric conditions, thereby mimicking a downstream hose disconnected state. As one example, one or more hose components mentioned above may be present individually or may be present in combination. For example, the orifice and the vent-vac valve may both be present in the exhaust system. In other examples, all the hose components may be present in the exhaust system. In examples where more than one hose component is present in the exhaust system, if a diagnostic routine utilizing one of the components (e.g., the pneumatic valve as described in more detail below with respect to FIG. 9) indicates degradation, the degradation of the downstream hose may be confirmed by another diagnostic routine (e.g., using the vent-vac valve as described in more detail below with respect to FIG. 10).

While the upstream hose 210 and downstream hose 212 are illustrated in FIG. 2 as each being coupled to the exhaust aftertreatment device 70, in some examples one or more of the upstream hose 210 and downstream hose 212 may be coupled to the exhaust passage 48. For example, rather than fluidically coupling to the housing of the aftertreatment device 70, the downstream hose 212 may fluidically couple to the exhaust passage 48 downstream of the GPF 206.

Thus, the differential pressure sensor 208 sees both upstream pressure and downstream pressure across the GPF 206 and the output of the DP sensor 208 is differential pressure. The differential pressure between the upstream and downstream sides of the GPF 206 increases in relation to an increase in the relative amount of particulate matter that accumulates in the particulate filter as exhaust gases continue to flow through. Controller 12 may thus be configured to estimate an amount of particulate matter accumulated in the GPF 206 based on the output of the DP sensor. In some embodiments, an absolute pressure sensor (not shown) may be coupled to the particulate filter at a certain position in the exhaust passage, to provide an estimate of the backpressure generated therein and an estimate of the filter load. In still other embodiments, pressure sensors may be coupled upstream and downstream of the filter, and the filter load may be based on the estimated pressure difference across the filter. In some examples, the differential pressure measured by the DP sensor may also be influenced by the various components that may be coupled in the upstream and downstream hose connections of the particulate filter, such as the orifice described above.

A muffler 220 is also positioned downstream of the exhaust device 70. Muffler 220 may reduce the amplitude of sound pressure created by the exhaust gases prior to their exit into the atmosphere. The exhaust gases may pass through one or more chambers or other sound-reducing structures within the muffler 220 before exiting the muffler via a muffler outlet to the exhaust passage 48 and/or a tailpipe of the exhaust system en route to atmosphere.

Exhaust system 200 includes an exhaust tuning valve 218 that is controlled to regulate the portion of exhaust gas that flows through muffler 220. The exhaust tuning valve 218 is mounted in the exhaust system 200, downstream of the exhaust device 70 and downstream of the DP sensor 208, wherein exhaust tuning valve 218 is coupled in a parallel passage 224 to the muffler 220. Exhaust gases exiting via the exhaust system of internal combustion engine 10 may pass through exhaust tuning valve 218 in certain conditions depending on whether the valve is in an open or a closed position. In one embodiment, when the exhaust tuning valve 218 is in the closed position, the exhaust gases may only exit (e.g., to atmosphere) by passing through the exhaust passage 48 and muffler 220 of the exhaust system 200. When the exhaust tuning valve 218 is in the open position, at least a portion of the exhaust gas may pass through passage 224 shown in FIG. 2, bypassing the muffler 220. In one example, the open vs. closed position of the exhaust tuning valve 218 may be varied by controller 12. The controller 12 may receive signals and communications from various sensors coupled to engine 10, such as from sensors coupled to the exhaust device 70, and in accordance may actuate exhaust tuning valve position to regulate the amounts of exhaust gases passing through the muffler. In other examples, the exhaust tuning valve 218 may be a passively-controlled valve that is maintained closed until exhaust pressure exceeds a threshold, at which point the exhaust tuning valve may open. In some examples, the exhaust tuning valve may be operated partially open or partially closed, allowing exhaust gases to be routed in part through the muffler and in part through the exhaust tuning valve and into the passage 224, before exiting into the atmosphere.

During engine operation, exhaust gases flow from the exhaust passage 48 into the exhaust aftertreatment device 70. In accordance with one embodiment of the disclosure, in the exhaust aftertreatment device 70, the exhaust first passes through TWC 204 that functions to remove CO, hydrocarbons, and NOx. A catalyst sensor such as CMS 214 may be positioned in the exhaust aftertreatment device 70 downstream of the TWC 204 to monitor the exhaust and/or the efficiency of TWC 204 and may send a signal to controller 12. Exhaust gases may then progress towards the GPF 206 where the exhaust is filtered to remove particulate matter pollutants. Over time, particulate matter may build up on the walls of the filter that may increase the backpressure, impacting negatively on fuel economy. Therefore, this buildup of particulate matter is burned off (e.g. regenerated) at regular intervals. Due to the temperature of the exhaust gas and close-coupled position of the GPF relative to the engine, regeneration of the GPF may occur relatively regularly and without having to perform a specific regeneration routine. However, in certain conditions or due to certain drive cycles (e.g., in-city driving), particulate matter may accumulate on the GPF and thus there may be a need to regenerate the GPF. For example, filter regeneration may be initiated at a fixed interval of miles of vehicle travel or when exhaust backpressure reaches a threshold value, which may be determined based on output of the differential pressure sensor reaching a selected output. Herein, the differential pressure sensor monitors the load of particulate matter on the GPF and the controller may initiate regeneration responsive to the load reaching a threshold level. To regenerate the GPF, the engine may be operated with rich air-fuel ratio, reductant may be injected into the exhaust, and/or other adjustments may be made to burn off the accumulated particulate matter.

The differential pressure sensor may also be used in detecting degradation of the GPF, where the pressure drop across the GPF is affected by volume of flowing exhaust gases and the load of particulate matter present on the GPF as well as other factors. Thus, identifying reduced differential pressure across the GPF by the DP sensor 208 may be indicative of a degraded GPF.

According to embodiments of the present disclosure, the gasoline particulate filter 206 may be diagnosed for degradation with the use of the differential pressure sensor 208 shown in FIG. 2, where the DP sensor 208 outputs the difference in exhaust pressure upstream and downstream of the GPF 206. As shown in FIG. 2, differential pressure sensor 208 is connected to an upstream side of GPF 206 via an upstream hose 210 and a downstream side of GPF 206 via a downstream hose 212. Thus, the differential pressure sensor 208 sees both upstream pressure and downstream pressure across the GPF 206, however the output of the DP sensor 208 is differential pressure (e.g. delta pressure). In the event that the upstream hose of the DP sensor becomes disconnected/decoupled from the exhaust passage, the output of the DP sensor drops to below a certain threshold indicating a hose disconnect and thus the controller identifies a defect in the exhaust system (as shown in FIG. 5 and explained in more detail below). However, in the event of the downstream hose of the DP sensor becoming disconnected from an exhaust passage, the controller may be unable to detect the downstream hose disconnect (as shown in FIG. 5) since the upstream-side of the differential pressure sensor is measuring exhaust pressure upstream of the GPF while the downstream side measures atmospheric pressure, and thus the output of the differential pressure sensor may mimic the pressure drop across the GPF.

FIG. 5 is a graph 500 depicting the output of the differential pressure sensor coupled across the particulate filter in the exhaust device (e.g. such as the DP sensor 208 coupled across GPF 206). The vertical axis represents the differential pressure output from the DP sensor 208 across the particulate filter and shows an increase in differential pressure in the direction of the vertical axis arrow. The horizontal axis represents exhaust volumetric flow via the exhaust system shown in FIG. 2. The graph includes a threshold line 508 below which an upstream-side hose disconnected state may be indicated. Plot 506 illustrates differential pressure as a function of exhaust volumetric flow under conditions that include an upstream hose of the DP sensor becoming disconnected from the GPF (e.g. such as the upstream hose 210). When the upstream hose is disconnected, the upstream hose open end may sense atmospheric conditions. The downstream hose in such a situation is still connected to the GPF at the downstream end and may measure downstream exhaust pressure. Thus, the differential pressure computed by the DP sensor may show the pressure difference as the depicted plot 506 in FIG. 5. The pressure difference measured (plot 506) when the upstream hose is disconnected may be lower than the detection threshold 508 and therefore an upstream hose disconnect condition may be readily identified.

Under certain conditions, a downstream hose of the DP sensor 208 may become disconnected from the GPF (e.g. such as the downstream hose 212) and the downstream hose open end may sense atmospheric conditions. As shown by plot 502, the output of the DP sensor in such a condition would be the differential of the upstream exhaust pressure and downstream atmospheric pressure (from the open end). As exhaust flow volume through the exhaust system 200 increases during engine operation, the differential pressure measured with the downstream hose disconnected also increases accordingly. Plot 504 shows differential pressure as a function of exhaust volumetric flow in an exhaust system including an intact downstream hose of the DP sensor. Plot 502 may be indistinguishable from plot 504, at least at lower exhaust mass flows, such that a downstream hose being disconnected may be indistinguishable from an intact downstream hose based on the differential pressure output of the DP sensor. When the downstream hose is connected, the exhaust pressure upstream of the particulate filter exceeds the downstream exhaust pressure (e.g. such as shown in plot 504) and in the example of the downstream hose becoming disconnected, the upstream exhaust pressure still exceeds the downstream pressure (e.g. such as shown in plot 502). Thus in both examples, the differential pressure output is above the detection threshold 508. Therefore, FIG. 5 shows that a downstream hose disconnected state may not be readily identified in all conditions.

As explained before, some engine systems may include an exhaust tuning valve in the exhaust passage such as the exhaust tuning valve 218 of FIG. 2. The exhaust tuning valve 218 is mounted in the exhaust system 200 in exhaust passage 224 parallel to the muffler 220, downstream of both the exhaust device 70 and the DP sensor 208. Exhaust gases may pass through exhaust tuning valve 218 depending on whether the valve is in an open or a closed position. In one example, the open vs. closed position of the exhaust tuning valve 218 may be varied by controller 12 dependent on engine operating conditions to allow for a desired noise level.

In the event that the downstream hose of the DP sensor becomes disconnected/decoupled from the exhaust passage that includes exhaust tuning valve 218, the DP sensor may be unable to detect a downstream hose disconnect as shown in FIG. 6, under conditions when the exhaust tuning valve 218 is in the closed position (e.g. partially closed or fully closed).

FIG. 6 shows a graph 600 depicting differential pressure as a function of exhaust flow volume for different exhaust system conditions. Line 602 shows differential pressure measured in an exhaust system that includes a clean GPF (e.g., a new and intact GPF). Line 604 shows differential pressure measured in an exhaust system having a missing GPF, with an exhaust tuning valve fully closed and with a downstream hose disconnected. Line 608 shows differential pressure measured in an exhaust system having missing GPF with a fully open exhaust tuning valve and downstream hose disconnected. Line 610 shows differential pressure measured in an exhaust system having a missing GPF (but intact downstream hose). Line 606 indicates a threshold pressure difference across the GPF, below which a missing GPF may be identified (e.g. as shown by line 610) due to the upstream and downstream hose connections of a DP sensor measuring the same pressure (e.g. free flowing exhaust due to a missing filter). In contrast, line 602 shows a clean and functional GPF with a higher differential pressure due to the upstream hose connection seeing upstream exhaust pressure that may be higher than the downstream exhaust pressure measured by the downstream hose connection of the DP sensor.

Line 604 shows that in exhaust systems with a missing GPF, if the downstream hose connection of the DP sensor becomes disconnected and the exhaust tuning valve is at a fully closed position, the missing GPF may be undetectable. When the exhaust tuning valve is fully closed, backpressure introduced into the exhaust system may be measured as upstream pressure by the upstream hose connection, while the disconnected downstream hose measures atmospheric conditions. Further, the differential pressure measured in such a condition (e.g. line 604 showing missing GPF with a downstream hose disconnected and the exhaust tuning valve fully closed) may be indistinguishable from a clean GPF in functioning in the exhaust system (e.g. line 602) and may lie above the detection threshold 606.

However, line 608 shows that if the exhaust tuning valve is fully opened, a missing GPF with a downstream hose disconnected may be detected. When the exhaust tuning valve is fully opened, the upstream hose connection measures free flowing exhaust due to the missing GPF, and the downstream disconnected hose connection sees atmospheric conditions. Line 608 shows the differential pressure measured by the DP sensor in such a situation is below threshold 606 and thus, a missing GPF with a downstream hose disconnected may be detected when the exhaust tuning valve is fully open. Thus, according to embodiments disclosed herein and described in more detail below with respect to FIGS. 3, 4, 8, 9 and 10, the downstream hose connection across the GPF may be tested for degradation by performing an intrusive test that includes modulating the exhaust tuning valve position and/or by performing a passive test. In an exhaust system having a GPF and a DP sensor, if the downstream hose of the DP sensor becomes disconnected or degraded and the downstream exhaust tuning valve is in a closed position, a higher than threshold differential pressure (see FIG. 6) may be measured due to the upstream end of the DP sensor measuring upstream exhaust pressure and backpressure from the closed exhaust tuning valve, while the downstream disconnected hose may measure atmospheric conditions. If the exhaust tuning valve is adjusted to an open position, a lower than threshold (see FIG. 6) differential pressure may be measured due to the upstream end of the DP sensor measuring upstream exhaust pressure and the downstream disconnected hose may measure atmospheric conditions while the backpressure is relieved by opening the exhaust tuning valve. Thus, by modulating the exhaust tuning valve position from closed to open and measuring differential pressure at both positions, variation in the differential pressure may indicate a downstream hose disconnected state. In one example, the exhaust tuning valve position may be modulated from closed to open to measure differential pressure and in a second example, exhaust tuning valve position may be modulated from open to closed and differential pressure be measured.

However, a downstream hose disconnect may need to be distinguished from a degraded particulate filter. FIG. 3 illustrates a method for diagnosing a particulate filter, where the decision as to whether to carry out the diagnostic routine is based on whether the downstream hose is degraded. FIG. 4 shows an example flowchart illustrating how a downstream hose disconnect may be detected by the intrusive test of modulating exhaust tuning valve from closed to open and be distinguished from a particulate filter degraded state. FIGS. 8-10 show example flowcharts illustrating methods for detecting degradation of the downstream hose when a passive exhaust tuning valve is present in the exhaust system.

Turning now to FIG. 3, a method 300 for diagnosing degradation of a particulate filter, such as GPF 206, in accordance with the present disclosure is illustrated. Instructions for carrying out method 300 and the rest of the methods included herein may be executed by controller 12 based on instructions stored on a memory of the controller and in conjunction with signals received from sensors of the engine system, such as the sensors described above with reference to FIGS. 1-2 (e.g., DP sensor 208). The controller may employ engine actuators of the engine system (e.g., an actuator coupled to and configured to adjust a position of the exhaust tuning valve 218) to adjust engine operation, according to the methods described below.

At 302, the method includes, estimating and/or measuring engine operating conditions. These may include, for example, engine speed, torque demand, boost level, engine temperature, exhaust temperature, barometric pressure, fuel octane content, fuel composition (e.g., fuel alcohol content), particulate filter load, etc. Estimating engine operating conditions may additionally include determining a noise operating mode that may be set according to operator's preferences. For example, an operator may enter a user input (e.g., via a touch display or other input mechanism communicatively coupled to the controller) selecting a desired noise mode, such as quiet, track, normal, etc.

At 304, the method includes adjusting an exhaust tuning valve, such as exhaust tuning valve 218, in accordance with the set noise mode during engine operation. In one example, the controller may adjust the opening and closing of the exhaust tuning valve 218 based on a calculation using a look-up table (e.g., specific to the selected noise mode) with the input being engine operating conditions (e.g. engine speed, load) and the output being the relative opening or closing of the exhaust tuning valve. For example, at low speed and engine idle conditions, the exhaust tuning valve may be closed while at high speed engine conditions, the exhaust valve may be tuned to an open position.

As another example, the exhaust tuning valve may be an electronic exhaust tuning valve and may be set directly by the operator according to operator's preferences. Additionally, a pre-set strategy could be employed, such as the electronic exhaust tuning valve may be automatically tuned (e.g. opened and closed) based on operator's preferences and driving habits.

In other examples, the exhaust tuning valve may be a passive valve that opens automatically (e.g., without a command from a controller) when exhaust pressure exceeds a threshold, for example.

At 306, method 300 determines if particulate filter diagnostic conditions are satisfied. The particulate filter diagnostic conditions may include the particulate matter load of the filter being within a desired range, temperature of the particulate filter being below a threshold, steady state engine operation (e.g., where exhaust gas mass flow and intake throttle position are each changing by less than a threshold amount), a predetermined amount of time having elapsed since a previous diagnostic routine was carried out, etc. If particulate filter diagnosis conditions are not met, then method 300 moves to 308 and waits to perform the filter diagnostic routine until the conditions for diagnostic determination have been satisfied. However, if diagnostic conditions are met, method 300 proceeds to 310 to determine if the downstream hose connecting the particulate filter has been degraded/disconnected from the exhaust passage. In one example, downstream hose degradation/disconnect may be diagnosed according to the method of FIG. 4, which will be explained in more detail below. Briefly, according to the method of FIG. 4, the downstream hose degradation or disconnection may be identified by monitoring the differential pressure across the GPF during conditions where the exhaust tuning valve is open and during conditions where the exhaust tuning valve is closed. By regulating the exhaust tuning valve from closed to open, differential pressure measurements using the output of the differential pressure sensor (such as DP sensor 208) may be indicative of the downstream hose of the GPF being disconnected from the exhaust passage. In other examples, a downstream hose degradation/disconnect may be diagnosed according to the methods of FIGS. 8, 9 and/or 10 explained in detail below with respect to FIGS. 8-10. For example, in vehicle systems employing a passive exhaust tuning valve, the differential pressure across the GPF may be monitored during changing exhaust gas flow conditions (e.g., tip-outs) to verify the downstream hose connections of the GPF in the exhaust passage.

If the method 400 of FIG. 4, method 800 of FIG. 8, method 900 of FIG. 9 and/or method 1000 of FIG. 10 indicate a downstream hose disconnect, then the method 300 moves to 312 and does not perform the PF diagnostic routine in spite of particulate filter conditions being met. Further, responsive to the indication of downstream hose disconnect, one or more engine operating parameters may be adjusted to reduce engine-out particulate matter load, such as spark timing, fuel injection amounts, and torque limits. As described earlier, the PF diagnostic routine relies on the output of the DP sensor coupled across the GPF in the exhaust passage. The reliability of the DP sensor output is further dependent on the upstream hose connection and downstream hose connection being in communication with the exhaust passage. If method 400 of FIG. 4, method 800 of FIG. 8, method 900 of FIG. 9 and/or method 1000 of FIG. 10 indicate a downstream hose disconnect, then an unreliable diagnosis of the PF function may result, and thus diagnosis of the PF may be delayed until the downstream hose connection is restored.

Returning to 310, when the answer at 310 is no (e.g., when the downstream hose disconnect is not indicated), method 300 proceeds to 314 to measure the differential pressure across the GPF. The differential pressure measured across the GPF is the output of the differential pressure sensor and is relied upon for determination of PF degradation, and in some examples may be sampled only after the verification of the downstream hose connection to the exhaust passage using the methods of FIGS. 4, 8, 9 and/or 10. At 316, method 300 determines if differential pressure measured across the GPF is different than an expected pressure. The expected differential pressure may be a range of differential pressures that are expected to be observed if the GPF is present and operating as intended. For example, the expected differential pressure may include a range of pressures from a lower limit pressure to an upper limit pressure, where below the lower limit pressure, the GPF may be missing, and above the upper limit pressure, the GPF may be plugged, blocked, or otherwise have a build-up of particulate matter that is greater than expected and hence indicates the GPF may be degraded. If the differential pressure output by the DP sensor is found to be equal to the expected pressure across the GPF (e.g., is within the range of expected pressures), then method 300 moves to 318 and as a result concludes that the PF is not degraded. Method 300 then returns.

On the other hand, if the differential pressure is not equal to the expected pressure in the exhaust passage (e.g., if the differential pressure is outside the range of expected pressures), after downstream hose connection has been verified the particulate filter is likely degraded. As such, method 300 proceeds to 320 to provide an indication that the GPF is degraded. The indication that the GPF is degraded may include outputting a notification to an operator that the GPF is degraded, such as by activating an indicator lamp and/or setting a diagnostic code. Further, responsive to the indication that the GPF is degraded, one or more engine operating parameters may be adjusted to reduce engine-out particulate matter load, such as ignition timing, engine output, boost pressure, etc. Method 300 then returns.

FIG. 4 is a flow chart illustrating a method 400 for diagnosing a downstream hose connection, where the downstream hose (such as downstream hose 212 of FIG. 2) fluidically couples a differential pressure sensor (such as sensor 208) to an exhaust component downstream of a particulate filter (such as GPF 206). At 402, the method includes estimating and/or measuring engine operating conditions. The engine operating conditions may include, for example, engine speed, torque demand, boost level, engine temperature, exhaust temperature, barometric pressure, fuel octane content, fuel composition (e.g., fuel alcohol content), particulate filter load, etc. At 404, the method determines if one or more entry conditions for a diagnostic test have been satisfied, the diagnostic test verifying a connection of the downstream hose to the GPF in the exhaust device. The entry conditions for the diagnostic test may be a pre-defined set of engine operating conditions that may all have to be satisfied in order for the method 400 to proceed further and may comprise air mass being within a desired test range, steady state conditions as defined by a change in mass air flow being less than a threshold, no existing exhaust tuning valve faults, no exhaust pressure sensor faults, exhaust being warm enough to test (as inferred by the catalyst temperature measured by a temperature sensor such as sensor 216), the test not having been performed during current trip (e.g. once per trip), engine coolant temperature being above a threshold, wait period between diagnostic attempts being satisfied (e.g. no rapid repeat of exhaust tuning valve for diagnostics), vehicle speed being greater than a minimum speed threshold, vehicle speed not being in a pass-by noise test range, pedal position not at wide open throttle, and the vehicle not being in the deceleration fuel cutoff phase. In one example, storage medium read-only memory 106 may be programmed with instructions executable by processor 102 to verify if entry conditions required for the diagnostic test have been satisfied. If all entry conditions are not met, then method 400 moves to 406 to continue maintaining current engine operating conditions. In other examples, not all entry conditions may have to be satisfied before proceeding, for example a subset of the entry conditions may be met. Maintaining current operating conditions may include continuing to adjust an exhaust tuning valve (such as valve 218) based on a selected noise mode. Maintaining current operating conditions may further include monitoring particulate filter load based on the output from the differential pressure sensor. Method 400 then returns.

However, if at 404 the subset or all of the entry conditions are satisfied, method 400 proceeds to begin the intrusive diagnostic test for checking the downstream hose connection of the DP sensor coupled across the GPF. At 408, method 400 begins the exhaust tuning valve open phase which includes fully opening the exhaust tuning valve at 410. Once the exhaust valve is fully open, at 412, the method includes computing a rolling average of the output of the differential pressure sensor. In one example, the rolling average differential pressure output may include a series of averages computed by the controller of varying subsets of the data accumulated over time. In another example, the rolling average may be a cumulative rolling average of all the stored data output of the DP sensor that may take into account each new output data of the DP sensor and may further compute the average of all data up to the current time. In yet another example, the computed average may be a non-rolling average that may involve discrete data obtained at the time of the intrusive test. As described herein, the open position of the exhaust tuning valve may operate as an exhaust by-pass system allowing a flow of exhaust gases via both the muffler and via the exhaust tuning valve into the atmosphere. The open position of the exhaust tuning valve thus may also function to relieve any built-up backpressure in the exhaust system 200. The exhaust tuning valve may only be held open for a specified duration of time to allow for determination of the average pressure output and once the open test duration expires, method 400 proceeds to close the valve at 414 to end the open phase of exhaust tuning valve. In other examples, the exhaust tuning valve may be returned to control based on selected noise mode once the open phase expires (e.g., the valve may be returned to a partially open position).

At 418, method 400 begins the exhaust tuning valve closed phase which includes fully closing the exhaust tuning valve at 420. In some examples, the open phase of the routine may transition directly into the closed phase (e.g., the closed phase may begin as soon as the open phase ends). In other examples, the closed phase may be spaced apart from the open phase by a duration. In still further examples, the closed phase may commence before the open phase.

After the exhaust valve is fully closed, the method includes computing a rolling average of the output of the differential pressure sensor at 422. As described before, the closed position of the exhaust tuning valve may seal the exhaust by-pass system and exhaust gases may only exit via muffler 220 into the atmosphere. The closed position of exhaust tuning valve may further build up backpressure in the exhaust system 200 due to a restricted flow of exhaust. This backpressure may be measured by the DP sensor and may be taken into account when computing differential pressure output over a rolling average with the exhaust valve in a closed position. The exhaust tuning valve may only be held closed for a specified duration of time to allow for determination of the average pressure output and once the test duration expires, method 400 proceeds to open the valve at 424 to end the closed phase of exhaust tuning valve.

At 426, method 400 calculates the difference between the open rolling average and the closed rolling average of the DP sensor output obtained at 412 and 422. In one example, the difference may be an absolute value, such that the differential between the two average differential pressures is assessed and the directionality of the difference may be dispensed with. At 428, method 400 determines if the calculated differential pressure (e.g. the difference between rolling average of DP sensor output during the open versus closed phases of the exhaust tuning valve at a given time) is found to be greater than a threshold. The threshold referred to at 428 may be indicative of an output of the DP sensor that is dependent on engine operating conditions and may further represent a pressure value above which degradation of the downstream hose connection is indicated. If the calculated differential pressure is not found to be greater than the threshold at 428, then method 400 concludes at 430 that the downstream hose is intact and is connected to the exhaust device/exhaust passage downstream of GPF 206. Method 400 then returns.

However, if the calculated differential pressure is found to be greater than the threshold at 428, then method 400 moves to 432 and diagnoses a downstream hose of the DP sensor as being disconnected from the exhaust system. As explained above with respect to FIG. 3, the downstream hose being disconnected may obscure accurate particulate filter diagnostics. Thus, at least in some examples, responsive to the indication that the downstream hose is disconnected, engine operating parameters may be adjusted to reduce engine-out particulate matter, thus lowering the particulate load on the particulate filter. The engine operating parameters that may be adjusted include spark timing, fuel injection amounts, engine torque limits, and/or other operating parameters. Method 400 then returns.

The method 400 described above includes a diagnostic test for a downstream hose connection across the GPF 206 that is an intrusive diagnostic test that may include intrusive valve actuation, which may be controlled by controller 12. The intrusive valve actuation may include commanding the exhaust tuning valve to a fully open or fully closed position, regardless of how the exhaust tuning valve would be controlled otherwise. In another example, the diagnosis may be done via a non-intrusive test during certain engine operating conditions as controlled by controller 12. For example, the controller may monitor differential pressure during engine operating conditions where the exhaust tuning valve is commanded to be fully open as part of the exhaust tuning valve control based on a selected noise mode. The controller may also monitor differential pressure during engine operating conditions where the exhaust tuning valve is commanded to be fully closed as part of the exhaust tuning valve control based on a selected noise mode. The difference between the monitored differential pressures may then be determined to determine if the downstream hose is connected.

Referring now to FIG. 7, an example operating sequence 700 illustrating an intrusive diagnostic test for an engine operating with a DP sensor (e.g., such as the sensor 208 shown in FIG. 2) and an exhaust tuning valve (e.g. such as the exhaust tuning valve 218 shown in FIG. 2) is shown. The intrusive test may detect a downstream hose disconnect by regulating the exhaust tuning valve position from fully open to fully closed and obtaining differential pressure outputs from the DP sensor at both valve positions. The intrusive test period consists of a valve open period (0-t1) and a valve closed period (t1-t2) and based on a comparison of differential pressure outputs obtained during these periods, a hose disconnected state may be inferred.

FIG. 7 shows differential pressure output from the DP sensor during different positions of the exhaust tuning valve, during steady-state conditions (e.g. constant exhaust flow rate) over time. The horizontal (x-axis) denotes time and the vertical markers t1-t2 identify exhaust valve open and close time durations during engine operation. The first plot from the top shows exhaust mass flow (line 702) over time, which stays relatively constant during the intrusive test period that includes the open and closed durations of the exhaust tuning. The second plot (line 704) denotes the exhaust tuning valve position over time (e.g. fully open during 0-t1 and fully closed during t1-t2). The third plot shows the differential pressure that may be measured by the DP sensor during the intrusive test period. The dotted line 708 depicts differential pressure measurements that may be seen when the downstream hose is intact/connected and the solid line 708 shows differential pressure measured when the downstream hose connection is disconnected.

As seen from line 708 in the third plot, the differential pressure output from the DP sensor does not change responsive the exhaust tuning valve being moved from the fully open to the fully closed position, when the downstream hose connection for the DP sensor is intact. However, as shown by plot 706, when the downstream hose is disconnected, and the exhaust tuning valve position is moved from fully open to fully closed, backpressure introduced into the system leads to an increase in differential pressure as measured by the DP sensor after time t1. Thus during exhaust tuning valve closed position (e.g. during t1-t2) when the downstream hose is disconnected, a higher differential pressure is observed (e.g. line 706) comparable to when the downstream hose is connected (e.g. line 708). This is because when the downstream hose is connected, the increased backpressure that results from closing the exhaust tuning valve is also measured by the downstream-side of the differential pressure sensor, resulting in a minimal or no change in the differential pressure. In contrast, when the downstream hose is disconnected, the increased backpressure that is measured by the upstream-side of the differential pressure sensor is relative to atmospheric pressure, which does not change when the exhaust tuning valve is closed.

As discussed in FIG. 4 before, the intrusive diagnostic test to check for a downstream hose connection may include an exhaust tuning valve open phase and an exhaust tuning valve closed phase. By adjusting the exhaust tuning valve from a fully open to a fully closed position, if the differential pressure increases (e.g. the output of the DP sensor from t1-t2 compared to the output of the DP sensor from 0-t1), then a downstream hose disconnect condition may be inferred.

As described earlier, the exhaust tuning valve may be an actively controlled exhaust tuning valve. In other examples, the exhaust tuning valve may be a passive exhaust tuning valve that may be controlled by a loaded spring in the exhaust such that high exhaust flow pressure may cause the valve to open while low exhaust flow pressure may maintain the valve closed.

In an exhaust system comprising a GPF and a DP sensor (such as the system described above with respect to FIG. 2), if the downstream hose of the DP sensor becomes disconnected and the downstream exhaust tuning valve is passive and maintained in a closed position, a downstream hose disconnect may need to be detected and be distinguished from a degraded particulate filter. With the exhaust tuning valve closed and the downstream hose disconnected or degraded, increased exhaust backpressure may result from the closure of the tuning valve and may be sensed by the upstream hose of the DP sensor, however the downstream hose of the differential pressure sensor may sense atmospheric pressure. As a result, the DP sensor may measure an increase in differential pressure when the exhaust tuning valve is closed and the downstream hose is disconnected, even when the GPF is missing or degraded, which may mimic the pressure drop measured by the DP sensor when an intact, non-degraded GPF is present. FIGS. 8-10 depict example flowcharts of how a downstream hose disconnect may be detected without active modulation of the exhaust tuning valve e.g. in exhaust systems employing a passive exhaust tuning valve. By using alternative methods to indicate degradation of a hose coupled across a particulate filter responsive to how the differential pressure output compares to a threshold, the differential exhaust flow pressure being measured by the DP sensor in the presence of an orifice included in the upstream hose, a pneumatic valve positioned in the upstream hose, and/or a vent-vacuum valve fluidly coupled to the downstream hose, as shown in FIG. 2, may be used to verify the downstream hose connection.

FIG. 8 shows a flowchart illustrating a method 800 for diagnosing degradation of a downstream hose housing a differential pressure sensor with the upstream hose having a small orifice (such as orifice 226 in FIG. 2). Method 800 describes a non-intrusive test that makes use of orifice 226 in the upstream hose connection. The orifice 226 may function as a mechanical low-pass filter, reducing exhaust pressure or flow pulsations and thus resulting in a smoother signal from the DP sensor. Further, the orifice may result in the upstream-side of the differential pressure sensor seeing delayed or smaller changes in pressure when exhaust mass flow changes. At 802, the method includes determining engine operating conditions. The engine operating conditions may include, for example, engine speed, torque demand, boost level, engine temperature, exhaust temperature, barometric pressure, fuel octane content, fuel composition (e.g., fuel alcohol content), particulate filter load, etc. At 804, the method determines if one or more entry conditions for a diagnostic test have been satisfied, the diagnostic test verifying a connection of the downstream hose to the GPF in the exhaust device. The entry conditions for the diagnostic test may be a pre-defined set of engine operating conditions that may all have to be satisfied in order for the method 800 to proceed further and may comprise air mass being within a desired test range, steady state conditions as defined by a change in mass air flow being less than a threshold, no existing exhaust tuning valve faults, no exhaust pressure sensor faults, exhaust being warm enough to test (as inferred by the catalyst temperature measured by a temperature sensor such as sensor 216), engine coolant temperature being above a threshold, the vehicle not being in the deceleration fuel cutoff phase, etc. In one example, storage medium read-only memory 106 may be programmed with instructions executable by processor 102 to verify if entry conditions required for the diagnostic test have been satisfied. If entry conditions are not met, then method 800 moves to 806 to continue maintaining current engine operating conditions. In other examples, not all entry conditions may have to be satisfied before proceeding, for example a subset of the entry conditions may be met. Maintaining current operating conditions may include continuing to operate the passive exhaust tuning valve 218 in a closed position (if the exhaust flow and hence pressure is relatively low) or in an open position (if the exhaust flow and hence pressure is relatively high). Maintaining current operating conditions may further include monitoring particulate filter load based on the output from the differential pressure sensor.

However, if at 804 entry conditions are determined as satisfied, then method 800 proceeds to begin the diagnostic test for checking the downstream hose connection of the DP sensor coupled across the GPF. At 808, method 800 measures differential pressure P1 as the output of the differential pressure sensor. In one example, differential pressure output data of the differential pressure sensor may be received by the controller and accumulated as a set of discrete pressure readings taken over time. At 810, method 800 determines a decrease in mass airflow is detected. A decrease in airflow may occur due to a change in operator-requested torque, such as due to a tip-out event. The decrease in air flow may be caused by changing the throttle position wherein throttle 62 may be operated to vary the intake air provided to combustion cylinder 30. In one example, airflow may be measured by mass air flow sensor 120 and/or a manifold air pressure sensor 122 that may provide MAF and MAP data to controller 12 to compute if a decrease in mass airflow has occurred. Alternatively, mass air flow may be calculated as a function of the manifold temperature, manifold pressure, throttle area and the like and a decrease in mass airflow computed by controller 12.

At 810, if the controller determines that there has been no decrease in airflow (or that airflow has decreased by less than a threshold amount), then method 800 returns to 806 to continue maintaining current engine operating conditions. However, if a decrease in airflow is determined at 810, then method 800 moves to 812 to measure differential pressure P2 as the output of the differential pressure sensor, wherein P2 is the differential pressure measured by the differential pressure sensor subsequent to a decrease in airflow occurring. More than one pressure reading may be taken during the decrease in airflow. At 814, method 800 calculates a rate of change in the differential pressure sensor output over a period of time for example, rate of change of differential pressure may be calculated by determining the difference of P2 and P1 (and further pressure measurements) as a function of time 't'. In an example, the rate of change determined at 814 may be an absolute rate of change.

At 816, method 800 then determines if the rate of change of differential pressure is less than a threshold. The threshold referred to at 816 may be a rate of change that would be expected if the downstream hose were connected. When the vehicle experiences a decrease in MAF such as during a tip-out event, intact upstream and downstream hose connections will result in the DP sensor sensing a decrease in pressure at both the upstream and downstream sides of the DP sensor. However, due to the orifice in the upstream hose, the upstream side of the differential pressure sensor will be exposed to changing exhaust pressure at a slower rate than the downstream side of the differential pressure sensor. In this condition, a rate of change of the differential pressure would briefly increase and then would decrease, and thus would be above the threshold referred to at 816.

Thus, if the calculated rate of change of differential pressure is not found to be less than the threshold at 816, then method 800 concludes at 818 that the downstream hose is intact and connected to the exhaust device/exhaust passage downstream of the GPF. Method 800 then returns.

However, a calculated rate of change of differential pressure found to be less than the threshold under decreasing MAF may be a result of a decrease in upstream pressure (due to decreasing MAF during a tip-out event) while the downstream hose connection records atmospheric pressure due to the downstream hose being disconnected. Thus, if the calculated rate of change of the differential pressure is found to be less than the threshold at 816, then method 800 moves to 820 and diagnoses the downstream hose of the DP sensor as being disconnected from the exhaust system. Method 800 then returns.

Figure 11:
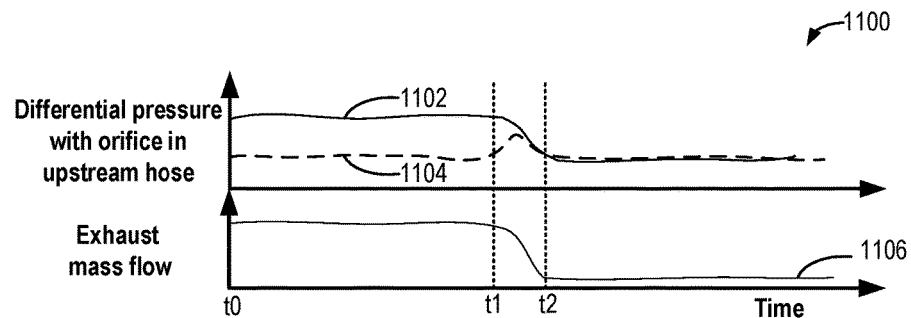
FIG. 11 shows a graph depicting the output of the differential pressure sensor coupled across the particulate filter in the exhaust device, with an orifice in the upstream hose.

Referring now to FIG. 11, a graph 1100 depicting the output of the differential pressure sensor coupled across the particulate filter in the exhaust device, with an orifice in the upstream hose, is shown. The two plots represented are time aligned and occur at the same time. The horizontal (x-axis) denotes time and the vertical markers t0-t2 identify times during which a change in exhaust mass flow during engine operation is experienced. The first plot from the top shows the differential pressure that may be measured by the DP sensor with the upstream hose connection including an orifice 226. The dotted line 1104 depicts differential pressure measurements that may be seen when the downstream hose is intact/connected to the exhaust system while the solid line 1102 shows differential pressure measured when the downstream hose connection is disconnected.

The second plot shows the change in exhaust mass flow during engine operation. The engine may operate with high exhaust flow during t0-t1. At time t1, a change in mass airflow may occur (e.g. a tip-out event) leading to decreased exhaust flow observed during t1-t2, depicted by line 1106.

During high exhaust flow conditions, both upstream and downstream hose connections when intact may be exposed to high exhaust pressure that may be measured by the DP sensor (e.g. line 1104 during t0-t1). At time t1, a change in mass exhaust flow through the exhaust system may be experienced, such as during a tip-out event which may cause only the downstream pressure to decrease rapidly, while the upstream pressure responds slowly due the restriction/orifice slowing the depressurization of the upstream line. Since the DP sensor outputs differential pressure, decreasing exhaust flows may yield a brief increase in pressure difference with every deceleration given intact hose connections, as shown by line 1104 during t1-t2. However, during high exhaust flow conditions when the downstream hose is disconnected, the upstream hose connection may see high upstream exhaust pressure while the downstream hose connection may continually sense atmospheric pressure yielding the differential pressure output from the DP sensor during t0-t1, shown by line 1102. At time t1, the decrease in mass exhaust flow reduces overall exhaust flow through the exhaust system leading to decreasing upstream pressure in the upstream hose connection while the downstream hose continues to sense atmospheric pressure. The differential pressure output of the DP sensor in this case decreases as shown by line 1102 during time t1-t2, to reflect the reduction in overall exhaust flow at the upstream side of the sensor. Thus, a comparison of the rate of change differential pressure measured during decreasing exhaust flow conditions may detect a downstream hose disconnect. In other words, a difference in DP output measured at t1-t2 vs. t0-t1 if found to be less than a threshold rate of change of pressure, may indicate a downstream hose as disconnected as described earlier at 816 of FIG. 8. By contrast, if the rate of change of differential pressure increases and then decreases, the downstream hose is indicated as connected.

During the downstream hose diagnostic routine (e.g., the method 800 of FIG. 8), the output from the differential pressure sensor may be collected at various times and analyzed to determine if the downstream hose is disconnected. In one example, the output from the differential pressure sensor may be obtained at time t1 of FIG. 11, which represents a first pressure measurement (e.g., P1) at the beginning of the tip-out event (e.g., as soon as the exhaust mass flow starts to decrease), as well as time points after t1, such as t2. Further, in some examples, the output from the differential pressure sensor may be obtained at one or more time points between t1 and t2, and a rate of change of the differential pressure from t1 to t2 may be calculated. Other mechanisms for monitoring a change (or lack thereof) in the differential pressure are possible, such as an average pressure from t1 to t2. The change in differential pressure is then compared to a threshold, which may be based on an expected change in differential pressure if the downstream hose is connected in one example, or may be based on an expected change in differential pressure if the downstream hose is disconnected. For example, as explained above, the differential pressure will only decrease during the tip-out event if the downstream hose is disconnected. Thus, if any increase followed by a decrease in differential pressure is observed, the hose may be indicated as connected. In still further examples, an expected change in differential pressure with the hose connected may be determined based on a temporary increase in differential pressure at the time of the tip-out and the change in exhaust mass flow, and the measured change in differential pressure may be compared to the expected change and the hose may be determined to be connected if the measured change in differential pressure is within a threshold range of the expected change in differential pressure.

In this way, by the monitoring of differential pressure across the GPF when a change in the MAF is occurring, a single direction change the output of the DP sensor may indicate the downstream hose is disconnected, while a twice change in direction of the output of the DP sensor (e.g., an increase followed by a decrease) may indicate the hose is connected.

FIG. 9 shows a flowchart illustrating an additional or alternative method 900 for diagnosing degradation of a downstream hose housing a differential pressure sensor with the upstream hose having an active pneumatic valve. Method 900 describes an intrusive test that makes use of an active pneumatic valve (e.g. pneumatic valve 228) positioned in the upstream hose, between the DP sensor and the exhaust passage. At 902, the method includes determining engine operating conditions as described earlier with reference to FIG. 8. At 904, the method determines if one or more entry conditions for the diagnostic test have been satisfied, the diagnostic test verifying a connection of the downstream hose to the GPF in the exhaust device. The entry conditions for the diagnostic test may be a pre-defined set of engine operating conditions that may have to be satisfied in order for the method 900 to proceed further as described earlier with reference to FIG. 8, for example an entry condition may include high exhaust flow through the exhaust system. In one example, storage medium read-only memory 106 may be programmed with instructions executable by processor 102 to verify if entry conditions required for the diagnostic test have been satisfied. If entry conditions are not met, then method 900 moves to 906 to continue maintaining current engine operating conditions. Maintaining current operating conditions may include continuing to operate the passive exhaust tuning valve (e.g., valve 218) in a closed position (if the exhaust flow and hence pressure is relatively low) or in an open position (if the exhaust flow and hence pressure is relatively high). Maintaining current operating conditions may further include monitoring particulate filter load based on the output from the differential pressure sensor.

At 904, if entry conditions are determined as satisfied, then method 900 proceeds to begin the diagnostic test for checking the downstream hose connection of the DP sensor coupled across the GPF. At 908, method 900 maintains the pneumatic valve in an open position in the upstream hose. The pneumatic valve may be an active valve that may be controlled pneumatically by the controller as described earlier in FIG. 2. At 910, method 900 measures P1 as the differential pressure output of the differential pressure sensor. In one example, pressure P1 may reflect more than one absolute measurement of the differential pressure output of the differential pressure sensor taken at pre-determined time intervals (e.g., an average of multiple pressure measurements), and may be stored in the memory of the controller. At 912, method 900 determines if a change in mass airflow, e.g. a tip-out event, has been detected. In one example, airflow may be measured by the various sensors of engine 10, such as mass air flow sensor 120 and/or a manifold air pressure sensor 122. Alternatively, mass air flow may be calculated as a function of the manifold temperature, manifold pressure, throttle area and the like and a change in mass airflow may be computed by controller 12. At 912, if the controller determines that there has been no change in airflow, then method 900 returns to 906 to continue maintaining current engine operating conditions. However, if a change in airflow is determined at 912, then method 900 moves to 914 to close the pneumatic valve in the upstream hose. The pneumatic valve when closed, traps the upstream exhaust between the pneumatic valve and the DP sensor. Thus the DP sensor measures a constant pressure on the upstream side. At 916, method 900 measures differential pressure P2 as the differential pressure output of the differential pressure sensor. In one example, pressure P2 may be a set of absolute differential pressure values from the DP sensor, taken over a defined time period following closure of the pneumatic valve. In other examples, pressure P2 may be an absolute value of the differential pressure output of the DP sensor, taken at a pre-determined time following closure of the pneumatic valve. At 918, method 900 calculates a change in the differential pressure sensor output after pneumatic valve adjustment. For example, a difference of measured differential pressure P2 (e.g. an absolute value of differential pressure output of the DP sensor after the pneumatic valve is closed, taken at a certain time or measured over a defined time period) and measured differential pressure P1 (e.g. an absolute differential pressure output of the differential pressure sensor measured immediately prior to when a change in airflow is determined, when the pneumatic valve is open) is calculated. In some examples, a range of values for pressure P2 measured after pneumatic valve closure, may be obtained from the DP sensor, depending on the amount of time elapsed since closure of the pneumatic valve. Therefore in one example, at 918, method 900 may calculate a change in DP sensor output by calculating a difference of various absolute values of P2 measured at defined time periods and P1 measured prior to change in airflow, when the pneumatic valve is open.

At 920, method 900 then determines if the calculated change of differential pressure is greater than a threshold. The threshold referred to at 920 may be a change that would be expected if the downstream hose were to be disconnected. The pneumatic valve, when open, allows the DP sensor to measure exhaust pressure upstream of the GPF and when closed blocks the fluidic connection between the exhaust flow upstream of the GPF and the DP sensor and traps the upstream exhaust between the pneumatic valve and the DP sensor. Thus, the DP sensor measures a constant pressure on the upstream side, while on the downstream side the DP sensor may measure a decreasing downstream exhaust pressure (e.g. due to tip-out condition) if the downstream hose connection of the DP sensor is intact. A change from a high exhaust flow condition to a tip-out condition with the pneumatic valve closed would therefore result in a differential pressure exceeding the threshold, which would indicate the downstream hose as intact and connected. Thus, if the calculated change in differential pressure (P2–P1) is found to be greater than the threshold at 920, then method 900 concludes at 922 that the downstream hose is intact and connected to the exhaust device/exhaust passage downstream of GPF 206. Method 900 then returns.

In contrast, if the downstream hose were disconnected and the DP sensor on the downstream side was measuring atmospheric pressure with the upstream side measuring a constant pressure, the overall change in pressure due to a change in MAF (e.g. tip-out), would result in the differential pressure output changing by less than the threshold, as both the upstream and downstream pressure measurements would remain constant after the valve were closed. Thus, if the change in differential pressure is determined to be not greater than the threshold at 920, then method 900 moves to 924 and diagnoses the downstream hose of the DP sensor as being disconnected from the exhaust system. Method 900 then returns.

In this way, by the monitoring of differential pressure in a vehicle system and by actively controlling a pneumatic valve to open and close in the upstream hose, a downstream hose disconnect may be diagnosed.

Figure 12:
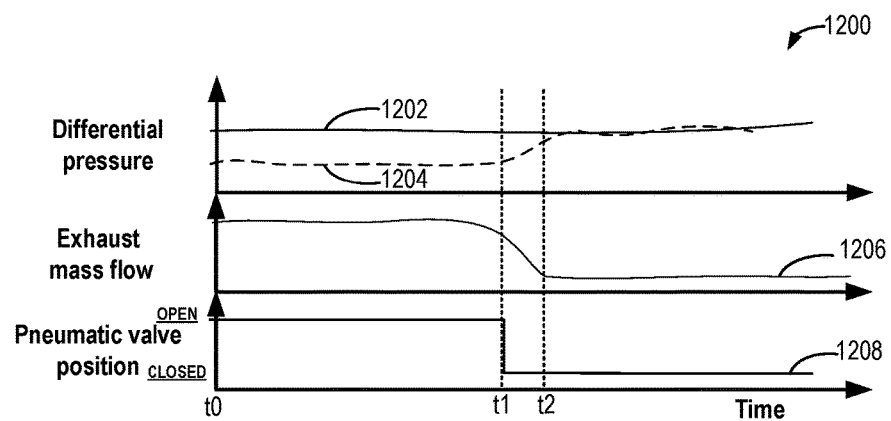
FIG. 12 shows a graph depicting the output of the differential pressure sensor coupled across the particulate filter in the exhaust device, with a pneumatic valve in the upstream hose.

FIG. 12 shows an example diagram 1200 of operating parameters that may be observed during the execution of method 900. Diagram 1200 includes a plot illustrating differential pressure (as output by the differential pressure sensor 208 for example), a plot illustrating exhaust mass flow, and a plot illustrating pneumatic valve position (e.g., the position of valve 228). For each plot, time is depicted along the x-axis and respective values of each operating parameter depicted along the y-axis. For the differential pressure and exhaust mass flow plots, values for the respective operating parameter increase in the direction of the arrows.

Prior to time t1, exhaust mass flow is relatively high, as illustrated by line 1206. The pneumatic valve is open, as illustrated by line 1208, resulting in the upstream side of the differential pressure sensor being exposed to exhaust flow/pressure upstream of the GPF. If the downstream hose is disconnected, the differential pressure measurement may be relatively high (or at least greater than zero), as shown by solid line 1202, due to the exhaust pressure upstream of the GPF being higher than atmospheric pressure. When the hose in connected, a relatively low differential pressure is measured (as shown by dotted line 1204), owing to both the upstream and downstream sides being exposed to similar pressures (however, depending on the load on the GPF, there may be a smaller or larger pressure drop across the GPF, which may result in the differential pressure either being relatively small, as shown, or larger).

At time t1, a tip-out event occurs, causing exhaust mass flow to decrease. Responsive to the decrease in the exhaust mass flow, the pneumatic valve is closed following time t1. Thus, exhaust is trapped between the valve and the upstream side of the differential pressure sensor, and as a result the upstream side of the differential pressure sensor measures a constant pressure. In contrast, if the downstream hose is connected, the downstream side is exposed to decreasing exhaust pressure. Accordingly, as shown by line 1204, at least between time t1 and t2, the differential pressure output by the differential pressure sensor will change (as shown, the differential pressure increases because the exhaust trapped behind the pneumatic valve is at a higher pressure than the exhaust pressure downstream of the GPF as the exhaust mass flow decreases during the tip-out).

If the downstream hose is disconnected, the differential pressure output by the differential pressure sensor will not change after the pneumatic valve closes, as both the upstream side and downstream side of the differential pressure sensor are exposed to constant pressures (the exhaust trapped behind the valve and atmospheric pressure, respectively). Accordingly, following the closure of the valve, the differential pressure for a disconnected hose does not change, as shown by line 1202.

During the downstream hose diagnostic routine (e.g., the method 900 of FIG. 9), the output from the differential pressure sensor may be collected at various times and analyzed to determine if the downstream hose is disconnected. In one example, the output from the differential pressure sensor may be obtained at time t1 of FIG. 12, which represents a first pressure measurement (e.g., P1) at or just before closing of the pneumatic valve, as well as time points after t1, such as t2. In other examples, P1 may be obtained once the pneumatic valve closes but while the exhaust mass flow is still changing (e.g., after t1 but before t2). Further, in some examples, the output from the differential pressure sensor may be obtained at one or more time points between t1 and t2, and a rate of change of the differential pressure from t1 to t2 may be calculated. Other mechanisms for monitoring a change (or lack thereof) in the differential pressure are possible, such as an average pressure from t1 to t2. The change in differential pressure is then compared to a threshold, which may be based on an expected change in differential pressure if the downstream hose is connected in one example, or may be based on an expected change in differential pressure if the downstream hose is disconnected. For example, as explained above, the differential pressure will not change appreciably following closure of the pneumatic valve if the downstream hose is disconnected. Thus, if any change in differential pressure is observed, the hose may be indicated as connected. In other examples, a change in differential pressure, though smaller than a threshold, may be indicative of a disconnected hose. In still further examples, an expected change in differential pressure with the hose connected may be determined based on differential pressure at the time of valve closing and the change in exhaust mass flow, and the measured change in differential pressure may be compared to the expected change and the hose may be determined to be connected if the measured change in differential pressure is within a threshold range of the expected change in differential pressure.

A further additional or alternative approach to diagnose a downstream hose disconnect is illustrated in FIG. 10. Turning now to FIG. 10, a flowchart illustrating a method 1000 for diagnosing degradation of a downstream hose housing a differential pressure sensor with the downstream hose having an active vent-vac valve is shown. Method 1000 describes another intrusive test that utilizes an active vent-vacuum valve (e.g. vent-vac valve 230) fluidly connected to the downstream hose, between the DP sensor and the exhaust passage. At 1002, method 1000 determines engine operating conditions as described earlier with reference to FIGS. 8-9. At 1004, the method determines if one or more entry conditions for the diagnostic test have been satisfied, the diagnostic test verifying a connection of the downstream hose to the GPF in the exhaust device. The entry conditions for the diagnostic test may be a pre-defined set of engine operating conditions that may have to be satisfied in order for the method 1000 to proceed further as described earlier with reference to FIGS. 8-9, for example an entry condition may include high exhaust flows through exhaust system 200. In one example, storage medium read-only memory 106 may be programmed with instructions executable by processor 102 to verify if entry conditions required for the diagnostic test have been satisfied. If entry conditions are not met, then method 1000 moves to 1006 to continue maintaining current engine operating conditions. Maintaining current operating conditions may include continuing to operate the passive exhaust tuning valve 218 in a closed position (if the exhaust flow and hence pressure is relatively low) or in an open position (if the exhaust flow and hence pressure is relatively high). Maintaining current operating conditions may further include monitoring particulate filter load based on the output from the differential pressure sensor.

At 1004, if entry conditions are determined to be satisfied, then method 1000 begins the diagnostic test for checking the downstream hose connection of the DP sensor coupled across the GPF. At 1008, method 1000 measures the differential pressure by obtaining output from the DP sensor prior to vent-vac valve adjustment. The vent-vac valve may be positioned in the downstream hose such that exhaust flowing into the downstream hose may pass via the vent-vac valve, for the DP sensor to sense exhaust flow downstream pressure. In one example, output of the differential pressure sensor may be received by the controller and stored as a set of discrete pressure readings taken over time. At 1010, method 1000 proceeds to verify the downstream hose connection of the DP sensor by adjustment of the vent-vac valve wherein adjusting the vent-vac valve may include movement of the vent-vac valve as indicated in FIG. 2. At 1012, method 1000 includes adjusting the vent-vac valve such that the vent-vac valve is closed on the exhaust system side and exhaust gas flowing through the exhaust passage into the downstream hose is no longer allowed to pass via the vent-vac valve to the DP sensor. Additionally at 1014, adjusting the vent-vac valve includes venting the vent-vac valve on the DP sensor side to atmosphere such that the DP sensor now measures atmospheric pressure at the downstream hose end. At 1016, method 1000 measures DP from the DP sensor output after vent-vac valve adjustments are made, wherein the adjusted vent-vac valve blocks the downstream exhaust flow on one end and on the other end allows the DP sensor to measure atmospheric pressure.

At 1018, method 1000 calculates a change in the output of the differential pressure sensor prior to and after vent-vac valve adjustment. For example, a difference of measured differential pressure when the vent-vac valve is open to allow exhaust flow in the downstream hose (from step 1008) and measured differential pressure after the vent-vac valve has been adjusted to block exhaust flow downstream and vent DP sensor to atmosphere (from step 1016), is calculated. At 1020, method 1000 then determines if the calculated change of differential pressure is greater than a threshold. The threshold referred to at 1020 may indicate a change in DP sensor output below which the downstream hose would be indicated as disconnected. Under conditions of high exhaust flow through the vehicle e.g. tip-in event, both upstream and downstream hose connections, when intact, would reflect high exhaust flow pressures upstream and downstream of the GPF respectively. However, upon intrusive adjustment of the vent-vac valve position to block downstream exhaust flow and vent the DP sensor to atmosphere in the event of a tip-in, the DP sensor may measure upstream exhaust pressure at the upstream end and atmospheric pressure at the downstream end, resulting in a change in differential pressure above a threshold. Thus, if the calculated change in differential pressure is found to be greater than the threshold at 1020, then method 1000 concludes at 1022 that the downstream hose is intact and connected to the exhaust device/exhaust passage downstream of GPF 206. However, if the calculated change is not greater than the threshold at 1020, then method 1000 moves to 1024 and diagnoses the downstream hose of the DP sensor as being disconnected from the exhaust system. Method 1000 then returns.

Figure 13:
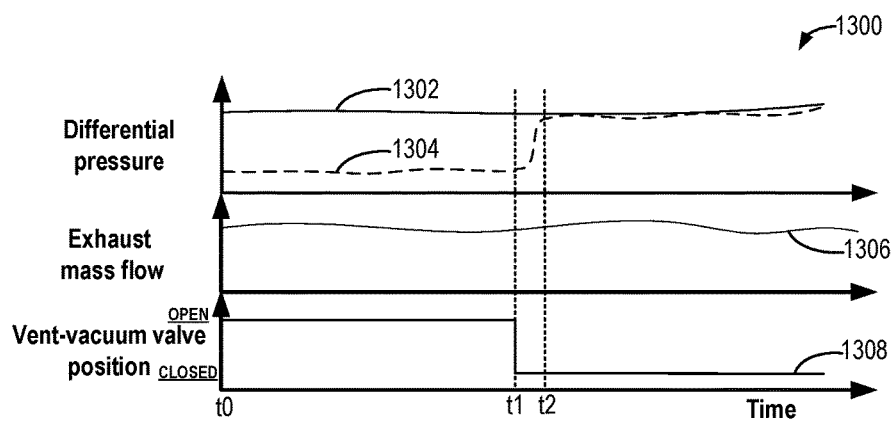
FIG. 13 shows a graph depicting the output of the differential pressure sensor coupled across the particulate filter in the exhaust device, with a vent-vacuum valve in the downstream hose.

FIG. 13 shows an example diagram 1300 of operating parameters that may be observed during the execution of method 1000. Diagram 1300 includes a plot illustrating differential pressure (as output by the differential pressure sensor 208 for example), a plot illustrating exhaust mass flow, and a plot illustrating vent-vac valve position (e.g., the position of valve 230). For each plot, time is depicted along the x-axis and respective values of each operating parameter depicted along the y-axis. For the differential pressure and exhaust mass flow plots, values for the respective operating parameter increase in the direction of the arrows.

Prior to time t1, and also following time t1, exhaust mass flow is relatively high and does not change by an appreciable amount, as illustrated by line 1306. The vent-vac valve is open, as illustrated by line 1308, resulting in the upstream side of the differential pressure sensor being exposed to exhaust flow/pressure upstream of the GPF and the downstream side of the differential pressure sensor being exposed to exhaust flow/pressure downstream of the GPF (if the downstream hose is connected) or atmosphere (if the downstream hose is disconnected). If the downstream hose is disconnected, the differential pressure measurement may be relatively high (or at least greater than zero), as shown by solid line 1302, due to the exhaust pressure upstream of the GPF being higher than atmospheric pressure. When the hose in connected, a relatively low differential pressure is measured (as shown by dotted line 1304), owing to both the upstream and downstream sides being exposed to similar pressures (however, depending on the load on the GPF, there may be a smaller or larger pressure drop across the GPF, which may result in the differential pressure either being relatively small, as shown, or larger).

At time t1, the vent-vac valve is closed, causing the downstream side of the differential pressure sensor to be exposed to atmosphere. If the downstream hose is connected, the closure of the vent-vac valve will cause the downstream side of the differential pressure sensor to switch from being exposed to exhaust pressure downstream of the GPF to being exposed to atmospheric pressure. Accordingly, as shown by line 1304, at least between time t1 and t2, the differential pressure output by the differential pressure sensor will change (as shown, the differential pressure increases because the exhaust pressure measured by the upstream side of the differential pressure sensor is at a higher pressure than atmospheric pressure).

If the downstream hose is disconnected, the differential pressure output by the differential pressure sensor will not change appreciably after the vent-vac valve closes, as the downstream side of the differential pressure sensor is still exposed to atmospheric pressure and the upstream side is exposed to exhaust pressure upstream of the GPF which is not changing due to steady-state engine operation. Accordingly, following the closure of the vent-vac valve, the differential pressure for a disconnected hose does not change, as shown by line 1302.

During the downstream hose diagnostic routine (e.g., the method 1000 of FIG. 10), the output from the differential pressure sensor may be collected at various times and analyzed to determine if the downstream hose is disconnected. In one example, the output from the differential pressure sensor may be obtained at time t1 of FIG. 13, which represents a first pressure measurement (e.g., P1) at or just before closing of the vent-vac valve, as well as time points after t1, such as t2. In other examples, P1 may be obtained before t1. Further, in some examples, the output from the differential pressure sensor may be obtained at t1 and t2 and one or more time points between t1 and t2, and a rate of change of the differential pressure from t1 to t2 may be calculated. Other mechanisms for monitoring a change (or lack thereof) in the differential pressure are possible, such as an average pressure from t1 to t2. The change in differential pressure is then compared to a threshold, which may be based on an expected change in differential pressure if the downstream hose is connected in one example, or may be based on an expected change in differential pressure if the downstream hose is disconnected. For example, as explained above, the differential pressure will not change appreciably following closure of the vent-vac valve if the downstream hose is disconnected. Thus, if any change in differential pressure is observed, the hose may be indicated as connected. In other examples, a change in differential pressure smaller than a threshold may be indicative of a disconnected hose. In still further examples, an expected change in differential pressure with the hose connected may be determined based on differential pressure at the time of valve closing and exhaust mass flow, and the measured change in differential pressure may be compared to the expected change and the hose may be determined to be connected if the measured change in differential pressure is within a threshold range of the expected change in differential pressure.

In this way, in vehicle systems employing a passive exhaust tuning valve, change in the differential pressure during changing exhaust flow conditions may be used to indicate a downstream hose disconnected state. Further, in systems employing an active exhaust tuning valve, regulating exhaust tuning valve position from open to closed and detecting a change in differential pressure may indicate a downstream hose disconnect. When hose disconnect is not indicated, monitoring differential pressure across the particulate filter and evaluating it against an expected pressure at a given time during engine operation, may indicate filter degradation. Thus, by monitoring the differential pressure sensor output, it may be possible to detect and distinguish between a particulate filter degraded state different from a hose disconnect and/or DP sensor degraded state, reliably and accurately.

The technical effect of performing a differential pressure hose diagnostic routine in an exhaust system that includes an active exhaust tuning valve or systems including a passive exhaust tuning valve in combination with one or more of an orifice, a pneumatic valve, or a vent-vac valve, is that a downstream hose disconnect of a differential pressure sensor coupled across the filter and/or a missing or degraded filter may be identified. By measuring differential pressure output from the DP sensor, a downstream hose connection that may have become disconnected may be distinguished from degradation of the particulate filter during engine operation. Overall, accuracy and reliability of vehicle diagnostics maybe improved.

In one example, a method for an engine is provided including during conditions where a differential pressure sensor is exposed to changing exhaust pressure, indicating degradation of a hose coupled across a particulate filter in an exhaust system responsive to a change in differential pressure measured by the differential pressure sensor being different than an expected change, the differential pressure sensor positioned in the hose and the particulate filter positioned upstream of an exhaust tuning valve. In a first example of the method, the exhaust tuning valve is coupled across a muffler positioned in an exhaust passage of the exhaust system downstream of a connection point, the connection point including a location where an outlet of the hose is configured to couple to the exhaust passage or to the particulate filter. In a second example of the method, which optionally includes the first example, the conditions where the differential pressure sensor is exposed to changing exhaust pressure may include a decrease in exhaust mass flow through the exhaust system, and indicating degradation of the hose responsive to the change in differential pressure being different than the expected change may include indicating degradation responsive to the change in differential pressure being less than the expected change. In a third example of the method, which optionally includes one or both of the first and second examples, the conditions where the differential pressure sensor is exposed to changing exhaust pressure may include a decrease in exhaust mass flow through the exhaust system with an upstream-side of the differential pressure sensor exposed to constant exhaust pressure, and indicating degradation of the hose responsive to the change in differential pressure being different than the expected change may include indicating degradation responsive to the change in differential pressure being less than the expected change. In a fourth example of the method, which optionally includes one or more or each of the first through third examples, the method further includes closing a valve coupled in an upstream portion of the hose responsive to detecting the decrease in exhaust mass flow in order to expose the upstream-side of the differential pressure sensor to constant exhaust pressure. In a fifth example of the method, which optionally includes one or more or each of the first through fourth examples, the conditions where the differential pressure sensor is exposed to changing exhaust pressure may include adjusting a position of a vent-vac valve positioned in a downstream portion of the hose to expose a downstream side of the differential pressure sensor to atmosphere, and indicating degradation of the hose responsive to the change in differential pressure being different than the expected change may include indicating degradation responsive to the change in differential pressure being less than the expected change. In a sixth example of the method, which optionally includes one or more or each of the first through fifth examples, the expected change is based on one or more of differential pressure prior to the differential pressure being exposed to the changing exhaust pressure and exhaust mass flow as the exhaust pressure is changing. In a seventh example of the method, which optionally includes one or more or each of the first through sixth examples, the method may further include, responsive to the change being within a threshold range of the expected change, indicating the hose is not degraded. In an eighth example of the method, which optionally includes one or more or each of the first through seventh examples, the method further includes, when the hose is not degraded, performing a particulate filter diagnostic routine responsive to particulate filter diagnostic conditions being met. In a ninth example of the method, which optionally includes one or more or each of the first through eighth examples, performing the particulate filter diagnostic routine may include measuring a filter differential pressure across the particulate filter with the differential pressure sensor; and if the filter differential pressure is outside of an expected filter differential pressure range, indicating degradation of the particulate filter. In a tenth example of the method, which optionally includes one or more or each of the first through ninth examples, the method further includes, responsive to indicating degradation of the hose, notifying an operator and/or setting a diagnostic code, and when the hose is degraded, not performing the particulate filter diagnostic routine even if the particulate filter diagnostic conditions are met. In an eleventh example of the method, which optionally includes one or more or each of the first through tenth examples, the method may further include adjusting one or more engine operating parameters responsive to indicating the hose is degraded.

Another example provides a system including a particulate filter coupled in an exhaust passage; a differential pressure sensor; an upstream hose coupling the differential pressure sensor to the exhaust passage upstream of the particulate filter; a downstream hose coupling the differential pressure sensor to the exhaust passage downstream of the particulate filter; a diagnostic valve positioned in the upstream hose; an exhaust tuning valve coupled across a muffler positioned in the exhaust passage downstream of the particulate filter and configured to open responsive to exhaust pressure above a threshold; and a controller storing instructions executable to, responsive to a command to perform a diagnosis of the downstream hose, close the diagnostic valve and indicate degradation of the downstream hose based on output from the differential pressure sensor while exhaust pressure in the exhaust system is changing. In a first example of the method, the command to perform the diagnosis of the downstream hose is responsive to an operator tip-out event where exhaust pressure in the exhaust system decreases, and the controller stores instructions executable to, responsive to indicating degradation of the hose, notify an operator, set a diagnostic code, and/or adjust one or more engine operating parameters. In a second example of the method, which optionally includes the first example, the controller is configured to indicate degradation of the downstream hose responsive to a change in differential pressure measured by the differential pressure during a duration following closure of the diagnostic valve being less than a threshold change. In a third example of the method, which optionally includes one or both of the first and second examples, the controller stores instructions executable to: responsive to the change being greater than the threshold change, indicate the hose is not degraded; when the hose is not degraded, perform a particulate filter diagnostic routine responsive to particulate filter diagnostic conditions being met, the particulate filter diagnostic routine comprising measuring a third pressure differential across the particulate filter with the differential pressure sensor; and if the third pressure differential is outside of an expected pressure differential range, indicating degradation of the particulate filter; and when the hose is degraded, not perform the particulate filter diagnostic routine even if the particulate filter diagnostic conditions are met.

Another example provides a system including a particulate filter coupled in an exhaust passage; a differential pressure sensor; an upstream hose coupling the differential pressure sensor to the exhaust passage upstream of the particulate filter; a downstream hose coupling the differential pressure sensor to the exhaust passage downstream of the particulate filter; a vent-vac valve positioned in the downstream hose; an exhaust tuning valve coupled across a muffler positioned in the exhaust passage downstream of the particulate filter and configured to open responsive to exhaust pressure above a threshold; and a controller storing instructions executable to: responsive to a command to perform a diagnosis of the downstream hose, adjust a position of the vent-vac valve to expose a downstream-side of the differential pressure sensor to atmosphere and indicate degradation of the downstream hose based on output from the differential pressure sensor following adjustment of the vent-vac valve position. In a first example of the method, the command to perform the diagnosis of the downstream hose is responsive to steady state conditions where exhaust mass flow in the exhaust system is above a threshold mass flow, and the controller stores instructions executable to, responsive to indicating degradation of the hose, notify an operator, set a diagnostic code, and/or adjust one or more engine operating parameters. In a second example of the method, which optionally includes the first example, the controller is configured to indicate degradation of the downstream hose responsive to a change in differential pressure measured by the differential pressure during a duration following adjustment of the vent-vac valve position being less than a threshold change. In a third example of the method, which optionally includes one or both of the first and second examples, the controller stores instructions executable to: responsive to the change being greater than the threshold change, indicate the hose is not degraded; when the hose is not degraded, perform a particulate filter diagnostic routine responsive to particulate filter diagnostic conditions being met, the particulate filter diagnostic routine comprising measuring a third pressure differential across the particulate filter with the differential pressure sensor; and if the third pressure differential is outside of an expected pressure differential range, indicating degradation of the particulate filter; and when the hose is degraded, not perform the particulate filter diagnostic routine even if the particulate filter diagnostic conditions are met.

Another example provides a method including indicating degradation of a hose coupled across a particulate filter responsive to a difference between a first differential pressure and a second differential pressure being greater than a threshold, the first differential pressure measured by a differential pressure sensor positioned in the hose responsive to a downstream exhaust tuning valve being fully open, the second differential pressure measured by the differential pressure sensor responsive to the exhaust tuning valve being fully closed. In a first example of the method, the exhaust tuning valve is coupled across a muffler positioned in an exhaust passage of the exhaust system downstream of a connection point, the connection point including a location where an outlet of the hose is configured to couple to the exhaust passage or to the particulate filter. A second example of the method optionally includes the first example and further includes wherein the first differential pressure and the second differential pressure are each measured responsive to hose diagnostic conditions being met, and further comprising when hose diagnostic conditions are not met, adjusting the exhaust tuning valve based on an operator-specified noise mode. In a third example of the method, which optionally includes one or both of the first and second examples, and the method further includes, responsive to the difference being less than the threshold, indicating the hose is not degraded. A fourth example of the method optionally includes one or more or each of the first through third examples, and further includes when the hose is not degraded, performing a particulate filter diagnostic routine responsive to particulate filter diagnostic conditions being met. A fifth example of the method optionally includes one or more or each of the first through fourth examples, and further includes wherein performing the particulate filter diagnostic routine may include measuring a third pressure differential across the particulate filter with the differential pressure sensor; and if the third pressure differential is outside of an expected pressure differential range, indicating degradation of the particulate filter. A sixth example of the method optionally includes one or more or each of the first through fifth examples, and further includes responsive to indicating degradation of the hose, notifying an operator and/or setting a diagnostic code, and when the hose is degraded, not performing the particulate filter diagnostic routine even if the particulate filter diagnostic conditions are met. A seventh example of the method optionally includes one or more or each of the first through sixth examples, and further includes adjusting one or more engine operating parameters responsive to indicating the hose is degraded.

Another example provides a system for an engine including a particulate filter coupled in an exhaust passage; a differential pressure sensor; an upstream hose coupling the differential pressure sensor to the exhaust passage upstream of the particulate filter; a downstream hose coupling the differential pressure sensor to the exhaust passage downstream of the particulate filter; an exhaust tuning valve coupled across a muffler positioned in the exhaust passage downstream of the particulate filter; and a controller storing instructions executable to: selectively adjust a position of the exhaust tuning valve based on an operator-selected noise mode; and responsive to a command to perform a diagnosis of the downstream hose, adjust the position of the exhaust tuning valve to a fully open position and to a fully closed position, and indicate degradation of the downstream hose based on output from the differential pressure sensor while the exhaust tuning valve is at the fully open position and while the exhaust tuning valve is at the fully closed position. In a first example of the system, the controller stores instructions executable to adjust the position of the exhaust tuning valve to a first position based on the operator-selected noise mode during a first engine speed and load condition; and during the first engine speed and load condition and responsive to the command to perform the diagnosis of the downstream hose, adjust the position of the exhaust tuning valve away from the first position to the fully open position. A second example of the system optionally includes the first example and further includes wherein the controller stores instructions executable to adjust the position of the exhaust tuning valve to the fully open position and measure a first average differential pressure with the differential pressure sensor while the exhaust tuning valve is in the fully open position; adjust the position of the exhaust tuning valve to the fully closed position and measure a second average differential pressure with the differential pressure sensor while the exhaust tuning valve is in the fully closed position; and indicate degradation of the downstream hose responsive to a difference between the first average differential pressure and second average differential pressure being greater than a threshold value. A third example of the system optionally includes one or more or both of the first and second examples, and further includes wherein the controller stores instructions executable to responsive to the difference being less than the threshold value, indicate the hose is not degraded; and when the hose is not degraded, perform a particulate filter diagnostic routine responsive to particulate filter diagnostic conditions being met, the particulate filter diagnostic routine comprising measuring a third pressure differential across the particulate filter with the differential pressure sensor; and if the third pressure differential is outside of an expected pressure differential range, indicating degradation of the particulate filter. A fourth example of the system optionally includes one or more or each of the first through third examples, and further includes wherein the controller stores instructions executable to, when the hose is degraded, not perform the particulate filter diagnostic routine even if the particulate filter diagnostic conditions are met. A fifth example of the system optionally includes one or more or each of the first through fourth examples, and further includes wherein the controller stores instructions executable to, responsive to indicating degradation of the hose, notify an operator, set a diagnostic code, and/or adjust one or more engine operating parameters.

Another example provides a method including responsive to a command to perform a diagnosis of a downstream hose coupling a differential pressure sensor to an exhaust passage downstream of a particulate filter, indicating degradation of the downstream hose based on output from the differential pressure sensor while an exhaust tuning valve is fully open and while the exhaust tuning valve is fully closed, the exhaust tuning valve coupled across a muffler positioned in the exhaust passage downstream of the particulate filter; when the downstream hose is not indicated as degraded, and responsive to particulate filter diagnosis conditions being met, performing a particulate filter diagnosis routine to indicate degradation of the particulate filter based on output from the differential pressure sensor, independent of exhaust tuning valve position; and when the downstream hose is indicated as degraded, and responsive to particulate filter diagnosis conditions being met, delaying performance of the particulate filter diagnosis routine until the downstream hose is no longer indicated as degraded. A first example of the method may include selectively adjusting a position of the exhaust tuning valve based on an operator-selected noise mode. A second example of the method optionally includes the first example and further includes wherein indicating degradation of the downstream hose based on output from the differential pressure sensor while the exhaust tuning valve is fully open and while the exhaust tuning valve is fully closed comprises determining a difference between a first average differential pressure measured in response to the exhaust tuning valve being fully open and a second average differential pressure measured in response to the exhaust tuning valve being fully closed, and indicating degradation when the difference is greater than a threshold difference. A third example of the method optionally includes one or more or both of the first and second examples, and further includes indicating degradation of an upstream hose coupling the differential pressure sensor to the exhaust passage upstream of the particulate filter responsive to a negative pressure differential measured by the differential pressure sensor. A fourth example of the method optionally includes one or more or each of the first through third examples, and further includes adjusting one or more engine operating parameters responsive to indicating degradation of the downstream hose. A fifth example of the method optionally includes one or more or each of the first through fourth examples, and further includes responsive to indicating degradation of the downstream hose, notifying an operator and/or setting a diagnostic code.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of operating a vehicle having an engine and a particulate filter coupled in an engine exhaust system, comprising:
during conditions where a differential pressure sensor is exposed to changing exhaust pressure, indicating degradation of a hose coupled across the particulate filter in the exhaust system responsive to a change in differential pressure measured by the differential pressure sensor being different than an expected change, the differential pressure sensor positioned in the hose and the particulate filter positioned upstream of an exhaust tuning valve, wherein the exhaust tuning valve is coupled across a muffler positioned in an exhaust passage of the exhaust system downstream of a connection point, the connection point including a location where an outlet of the hose is configured to couple to the exhaust passage or to the particulate filter.

2. The method of claim 1, wherein the conditions where the differential pressure sensor is exposed to changing exhaust pressure comprise a decrease in exhaust mass flow through the exhaust system, and wherein indicating degradation of the hose responsive to the change in differential pressure being different than the expected change comprises indicating degradation responsive to the change in differential pressure being less than the expected change.

3. The method of claim 1, wherein the conditions where the differential pressure sensor is exposed to changing exhaust pressure comprise a decrease in exhaust mass flow through the exhaust system with an upstream-side of the differential pressure sensor exposed to constant exhaust pressure, and wherein indicating degradation of the hose responsive to the change in differential pressure being different than the expected change comprises indicating degradation responsive to the change in differential pressure being less than the expected change.

4. The method of claim 3, further comprising closing a valve coupled in an upstream portion of the hose responsive to detecting the decrease in exhaust mass flow in order to expose the upstream-side of the differential pressure sensor to constant exhaust pressure.

5. The method of claim 1, wherein the conditions where the differential pressure sensor is exposed to changing exhaust pressure comprise adjusting a position of a vent-vac valve positioned in a downstream portion of the hose to expose a downstream side of the differential pressure sensor to atmosphere, and wherein indicating degradation of the hose responsive to the change in differential pressure being different than the expected change comprises indicating degradation responsive to the change in differential pressure being less than the expected change.

6. The method of claim 1, wherein the expected change is based on one or more of differential pressure prior to the differential pressure being exposed to the changing exhaust pressure and exhaust mass flow as the exhaust pressure is changing.

7. The method of claim 1, further comprising, responsive to the change being within a threshold range of the expected change, indicating the hose is not degraded.

8. The method of claim 7, further comprising, when the hose is not degraded, performing a particulate filter diagnostic routine responsive to particulate filter diagnostic conditions being met.

9. The method of claim 8, wherein performing the particulate filter diagnostic routine comprises:
measuring a filter differential pressure across the particulate filter with the differential pressure sensor; and
if the filter differential pressure is outside of an expected filter differential pressure range, indicating degradation of the particulate filter.

10. The method of claim 8, further comprising, responsive to indicating degradation of the hose, one or more of notifying an operator and setting a diagnostic code, and when the hose is degraded, not performing the particulate filter diagnostic routine even if the particulate filter diagnostic conditions are met.

11. The method of claim 1, further comprising adjusting one or more engine operating parameters responsive to indicating the hose is degraded.

12. A system for an engine, comprising:
a particulate filter coupled in an exhaust passage;
a differential pressure sensor;
an upstream hose coupling the differential pressure sensor to the exhaust passage upstream of the particulate filter;
a downstream hose coupling the differential pressure sensor to the exhaust passage downstream of the particulate filter;
a diagnostic valve positioned in the upstream hose;
an exhaust tuning valve coupled across a muffler positioned in the exhaust passage downstream of the particulate filter and configured to open responsive to exhaust pressure above a threshold; and
a controller storing instructions executable to:
responsive to a command to perform a diagnosis of the downstream hose, close the diagnostic valve and indicate degradation of the downstream hose based on output from the differential pressure sensor while exhaust pressure in the exhaust system is changing.

13. The system of claim 12, wherein the command to perform the diagnosis of the downstream hose is responsive to an operator tip-out event where exhaust pressure in the exhaust system decreases, and wherein the controller stores instructions executable to, responsive to indicating degradation of the downstream hose, one or more of notify an operator, set a diagnostic code, and adjust one or more engine operating parameters.

14. The system of claim 12, wherein the controller is configured to indicate degradation of the downstream hose responsive to a change in differential pressure measured by the differential pressure during a duration following closure of the diagnostic valve being less than a threshold change.

15. The system of claim 14, wherein the controller stores instructions executable to:
responsive to the change being greater than the threshold change, indicate the downstream hose is not degraded;

when the downstream hose is not degraded, perform a particulate filter diagnostic routine responsive to particulate filter diagnostic conditions being met, the particulate filter diagnostic routine comprising measuring a third pressure differential across the particulate filter with the differential pressure sensor; and if the third pressure differential is outside of an expected pressure differential range, indicating degradation of the particulate filter; and when the downstream hose is degraded, not perform the particulate filter diagnostic routine even if the particulate filter diagnostic conditions are met.

16. A system for an engine, comprising:
a particulate filter coupled in an exhaust passage;
a differential pressure sensor;
an upstream hose coupling the differential pressure sensor to the exhaust passage upstream of the particulate filter;
a downstream hose coupling the differential pressure sensor to the exhaust passage downstream of the particulate filter;
a vent-vac valve positioned in the downstream hose;
an exhaust tuning valve coupled across a muffler positioned in the exhaust passage downstream of the particulate filter and configured to open responsive to exhaust pressure above a threshold; and
a controller storing instructions executable to:
responsive to a command to perform a diagnosis of the downstream hose, adjust a position of the vent-vac valve to expose a downstream-side of the differential pressure sensor to atmosphere and indicate degradation of the downstream hose based on output from the differential pressure sensor following adjustment of the vent-vac valve position.

17. The system of claim 16, wherein the command to perform the diagnosis of the downstream hose is responsive to steady state conditions where exhaust mass flow in the exhaust system is above a threshold mass flow, and wherein the controller stores instructions executable to, responsive to indicating degradation of the downstream hose, notify an operator, set a diagnostic code, and/or adjust one or more engine operating parameters.

18. The system of claim 16, wherein the controller is configured to indicate degradation of the downstream hose responsive to a change in differential pressure measured by the differential pressure sensor during a duration following adjustment of the vent-vac valve position being less than a threshold change.

19. The system of claim 18, wherein the controller stores instructions executable to:

responsive to the change being greater than the threshold change, indicate the downstream hose is not degraded;

when the downstream hose is not degraded, perform a particulate filter diagnostic routine responsive to particulate filter diagnostic conditions being met, the particulate filter diagnostic routine comprising measuring a third pressure differential across the particulate filter with the differential pressure sensor; and if the third pressure differential is outside of an expected pressure differential range, indicating degradation of the particulate filter; and when the downstream hose is degraded, not perform the particulate filter diagnostic routine even if the particulate filter diagnostic conditions are met.

* * * * *